United States Patent
Lee et al.

(10) Patent No.: US 11,778,470 B2
(45) Date of Patent: Oct. 3, 2023

(54) PROTECTION OF CONTROL SIGNALING IN A WIRELESS BACKHAUL NETWORK

(71) Applicant: QUALCOMM Incorporated, San Diego, CA (US)

(72) Inventors: Soo Bum Lee, San Diego, CA (US); Karl Georg Hampel, Hoboken, NJ (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/019,169

(22) Filed: Sep. 11, 2020

(65) Prior Publication Data

US 2021/0112415 A1 Apr. 15, 2021

Related U.S. Application Data

(60) Provisional application No. 62/914,259, filed on Oct. 11, 2019.

(51) Int. Cl.
*H04W 12/102* (2021.01)
*H04W 40/12* (2009.01)
(Continued)

(52) U.S. Cl.
CPC ......... *H04W 12/102* (2021.01); *H04W 12/06* (2013.01); *H04W 40/12* (2013.01);
(Continued)

(58) Field of Classification Search
CPC ... H04W 76/00–27; H04W 88/08–182; H04W 92/00–06; H04W 92/10–16
See application file for complete search history.

(56) References Cited

U.S. PATENT DOCUMENTS 8,873,752 B1* 10/2014 Machiraju ............. H04L 9/3234
380/247
2008/0247353 A1* 10/2008 Pun ....................... H04W 40/32
370/328
(Continued)

OTHER PUBLICATIONS

"3rd Generation Partnership Project; Technical Specification Group Radio Access Network; NR; Study on Integrated Access and Backhaul; (Release 16)," 3GPP Draft, 38874-G00, 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051576885, pp. 1-111, Retrieved from the Internet: URL: http://www.3gpp.org/ftp/tsg%5Fran/WG2%5FRL2/Specifications/201812%5Ffinal%5Fspecs%5Fafter%5FRAN/38874%2Dg00%2Ezip [retrieved on Jan. 11, 2019]section 9.7, Best Available Date: V16.0.0 Dec. 2018.
(Continued)

*Primary Examiner* — San Htun
(74) *Attorney, Agent, or Firm* — Holland & Hart LLP

(57) ABSTRACT

Methods, systems, and devices for wireless communications are described. A first parent node of a wireless backhaul network may receive, from a donor node of the wireless backhaul network, a token for a child node of the wireless backhaul network, the token being unique to a first wireless link between the first parent node and the child node. The first parent node may determine that a triggering event has occurred for a second wireless link between the first parent node and a second parent node. The first parent node may transmit, in response to determining that the triggering event has occurred, the token to the child node over the first wireless link to indicate for the child node to select a third parent node of the wireless backhaul network.

30 Claims, 15 Drawing Sheets

(51) Int. Cl.
    *H04W 84/04*     (2009.01)
    *H04W 76/19*     (2018.01)
    *H04W 12/06*     (2021.01)
    *H04W 92/04*     (2009.01)

(52) U.S. Cl.
    CPC .......... *H04W 76/19* (2018.02); *H04W 84/047* (2013.01); *H04W 92/04* (2013.01)

(56) References Cited

U.S. PATENT DOCUMENTS

| | | | | |
|---|---|---|---|---|
| 2011/0080864 A1* | 4/2011 | Cai | ........................ | H04W 36/30 |
| | | | | 370/332 |
| 2012/0110336 A1* | 5/2012 | Frey | ...................... | G06F 21/565 |
| | | | | 713/181 |
| 2015/0131618 A1* | 5/2015 | Chen | .................... | H04W 16/02 |
| | | | | 370/332 |
| 2015/0163091 A1* | 6/2015 | Thubert | .............. | H04L 41/0668 |
| | | | | 370/225 |
| 2019/0394823 A1* | 12/2019 | Jo | .......................... | B60W 50/14 |
| 2019/0394825 A1* | 12/2019 | Byun | .................. | H04W 72/042 |
| 2020/0022054 A1* | 1/2020 | Hong | ................ | H04W 36/0085 |

OTHER PUBLICATIONS

Ericsson: "New KI: Protection of Recovery from Backhaul-RLF," 3GPP Draft, 3GPP TSG-SA WG3 Meeting #95-BIS, S3-192029 New KI Recovery Backhaul RLF, 3rd Generation Partnership Project (3GPP), Mobile Competence Centre, 650, Route Des Lucioles, F-06921, Sophia-Antipolis Cedex, France, vol. SA WG3, No. Sapporo (Japan), Jun. 24, 2019-Jan. 28, 2019, Jun. 17, 2019 (Jun. 17, 2019), XP051752973, 2 pages, Retrieved from the Internet: URL: http://www.3gpp.org/ftp/tsg%5Fsa/WG3%5FSecurity/TSGS3%5F95Bis%5FSapporo/Docs/S3%2D192029%2Ezip [retrieved on Jun. 17, 2019] the whole document, Best Available Date: Jun. 24-28, 2019.

Ericsson: "New Solution: Secure Recovery from Backhaul-RLF," 3GPP Draft, 3GPP TSG-SA WG3 Meeting #96, S3-192827_New_Sol_Secure_Recovery_Backhaul_RLF, 3rd Generation Partnership Project (3GPP), Mobile Competence Centre, 650, Route Des Lucioles, F-06921, Sophia-Antipolis Cedex, France, vol. SA WG3, No. Wroclaw (Poland); Aug. 26, 2019-Aug. 30, 2019, Aug. 19, 2019 (Aug. 19, 2019), XP051776662, 3 pages, Retrieved from the Internet: URL: http://www.3gpp.org/ftp/tsg_sa/WG3_Security/TSGS3_96_Wroclaw/Docs/S3-192827.zip [retrieved on Aug. 19, 2019] section 4, Best Available Date: Aug. 26-30, 2019.

International Search Report and Written Opinion—PCT/US2020/050698—ISA/EPO—Nov. 24, 2020.

* cited by examiner

PROTECTION OF CONTROL SIGNALING IN A WIRELESS BACKHAUL NETWORK

CROSS REFERENCE

The present application for patent claims the benefit of U.S. Provisional Patent Application No. 62/914,259 by LEE et al., entitled "PROTECTION OF CONTROL SIGNALING IN A WIRELESS BACKHAUL NETWORK," filed Oct. 11, 2019, assigned to the assignee hereof, and expressly incorporated by reference herein.

BACKGROUND

The following relates generally to wireless communications, and more specifically to protection of control signaling in a wireless backhaul network.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support a wireless backhaul network, such as an integrated access and backhaul (IAB) network, that includes a donor node (e.g., an IAB donor (or anchor) node) and one or more relay nodes downstream from the donor node. In some aspects, an IAB network shares resources and relays traffic between access and backhaul links. This may include various control signaling exchanged between the nodes of the IAB network. If a control message from a parent node to a child node is not protected, an over-the-air attacker may trigger a backhaul radio link failure (RLF) recovery on the child node to disrupt the IAB network. This may mean an abrupt loss of connection for a large number of UEs, short- and/or long-term link degradation, throughput reduction, a negative user experience, and the like. Therefore, it may be desirable to increase security of signaling between IAB nodes.

SUMMARY

The described techniques relate to improved methods, systems, devices, and apparatuses that support protection of control signaling in a wireless backhaul network. Generally, the described techniques provide for various mechanisms to ensure the integrity of control signaling between nodes of a wireless backhaul network, such as an integrated access and backhaul (IAB) network. Broadly, aspects of the described techniques may include a node (which may be referred to as a child node in this context) exchanging one or more security keys, physical parameters of its parent node, and the like, with a donor node in order to configure a token (and/or parameter(s) for the token). The token is configured such that it is unique to a wireless link between the child node and its first parent node (e.g., the first upstream node within the wireless backhaul network that the child node connects to in order to establish a link to the donor node). The donor node may provide the token (and/or parameter(s) of the token) to the first parent node of the child node. The first parent node may maintain the token until it detects or otherwise determines that a triggering event has occurred. The triggering event may be with respect to any upstream wireless link of the first parent node, such as a second wireless link between the first parent node and a second parent node. In this context, the second parent node may be any upstream parent node from the perspective of the first parent node, e.g., a parent node between the first parent node and the donor node. In some examples, the second parent node may be the donor node.

Upon detecting the triggering event, the first parent node may transmit the token to the child node over the first wireless link to indicate or otherwise convey information directing the child node to select a third parent node (e.g., a new parent node) in the wireless backhaul network. The child node may use the configured one or more parameters and/or the configured token to verify the integrity of the token received from the first parent node. For example, the child node may confirm that the token received from the first parent node matches or otherwise corresponds to the token (and/or parameter(s) associated with the token) configured with the donor node. The triggering event may include any event that causes the child node to disconnect from the first parent node in order to select a new parent node, e.g., such as a radio link failure (RLF) for the second wireless link, that the performance of the second wireless link has deteriorated to such a point that it satisfies (or fails to satisfy) a threshold value, and the like. Once the integrity of the token is verified by the child node, the child node may connect to a new parent node (e.g., a third parent node) of the wireless backhaul network and configure a new token for the new connection between the child node and the new parent node. Accordingly, the token provides, among other benefits, a mechanism by which the integrity of the control information received from the first parent node is verified by the child node.

A method of wireless communication at a first parent node of a wireless backhaul network is described. The method may include receiving, from a donor node of the wireless backhaul network, a token for a child node of the wireless backhaul network, the token being unique to a first wireless link between the first parent node and the child node, determining that a triggering event has occurred for a second wireless link between the first parent node and a second parent node, and transmitting, in response to determining that the triggering event has occurred, the token to the child node over the first wireless link to indicate for the child node to select a third parent node of the wireless backhaul network.

An apparatus for wireless communication at a first parent node of a wireless backhaul network is described. The apparatus may include a processor, memory coupled with the processor, and instructions stored in the memory. The instructions may be executable by the processor to cause the apparatus to receive, from a donor node of the wireless backhaul network, a token for a child node of the wireless backhaul network, the token being unique to a first wireless link between the first parent node and the child node, determine that a triggering event has occurred for a second wireless link between the first parent node and a second parent node, and transmit, in response to determining that the triggering event has occurred, the token to the child node over the first wireless link to indicate for the child node to select a third parent node of the wireless backhaul network.

Another apparatus for wireless communication at a first parent node of a wireless backhaul network is described. The apparatus may include means for receiving, from a donor node of the wireless backhaul network, a token for a child node of the wireless backhaul network, the token being unique to a first wireless link between the first parent node and the child node, determining that a triggering event has occurred for a second wireless link between the first parent node and a second parent node, and transmitting, in response to determining that the triggering event has occurred, the token to the child node over the first wireless link to indicate for the child node to select a third parent node of the wireless backhaul network.

A non-transitory computer-readable medium storing code for wireless communication at a first parent node of a wireless backhaul network is described. The code may include instructions executable by a processor to receive, from a donor node of the wireless backhaul network, a token for a child node of the wireless backhaul network, the token being unique to a first wireless link between the first parent node and the child node, determine that a triggering event has occurred for a second wireless link between the first parent node and a second parent node, and transmit, in response to determining that the triggering event has occurred, the token to the child node over the first wireless link to indicate for the child node to select a third parent node of the wireless backhaul network.

Some examples of the method, apparatuses, and non-transitory computer-readable medium described herein may further include operations, features, means, or instructions for discarding the token after the token may be delivered to the child node.

In some examples of the method, apparatuses, and non-transitory computer-readable medium described herein, the token may be transmitted to the child node using a uni-cast transmission, or a broadcast transmission, or a control channel transmission, or a data channel transmission, or a combination thereof.

In some examples of the method, apparatuses, and non-transitory computer-readable medium described herein, determining that the triggering event may have occurred may include operations, features, means, or instructions for determining an RLF for the second wireless link, the token transmitted to the child node in response to the RLF.

In some examples of the method, apparatuses, and non-transitory computer-readable medium described herein, determining that the triggering event may have occurred may include operations, features, means, or instructions for determining that the child node may be to tune away from the first wireless link with the first parent node.

In some examples of the method, apparatuses, and non-transitory computer-readable medium described herein, determining that the triggering event may have occurred may include operations, features, means, or instructions for determining that a metric of the second wireless link satisfies or fails to satisfy a threshold value.

In some examples of the method, apparatuses, and non-transitory computer-readable medium described herein, determining that the triggering event may have occurred may include operations, features, means, or instructions for receiving an indication that the child node may be to perform a cell reselection procedure away from the first parent node.

In some examples of the method, apparatuses, and non-transitory computer-readable medium described herein, receiving the token may include operations, features, means, or instructions for receiving the token from the donor node in a medium access control (MAC) control element (CE), or a backhaul adaptation protocol (BAP) signaling, or a radio link control (RLC) signaling, or a radio resource control (RRC) signaling, or a combination thereof.

In some examples of the method, apparatuses, and non-transitory computer-readable medium described herein, transmitting the token may include operations, features, means, or instructions for transmitting the token to the child node in a MAC CE, or a BAP signaling, or an RLC signaling, or a combination thereof.

In some examples of the method, apparatuses, and non-transitory computer-readable medium described herein, the second parent node includes the donor node.

In some examples of the method, apparatuses, and non-transitory computer-readable medium described herein, the second parent node may be upstream relative to the first parent node and downstream relative to the donor node.

A method of wireless communication at a child node of a wireless backhaul network is described. The method may include configuring, for a connection with a donor node of the wireless backhaul network and via a first parent node, one or more parameters for a token for the child node that is unique to a first wireless link between the child node and the first parent node, receiving the token from the first parent node over the first wireless link of the wireless backhaul network indicating that a triggering event has occurred for a second wireless link between the first parent node and a second parent node, and verifying the integrity of the received token based on the configured one or more parameters for the token.

An apparatus for wireless communication at a child node of a wireless backhaul network is described. The apparatus may include a processor, memory coupled with the processor, and instructions stored in the memory. The instructions may be executable by the processor to cause the apparatus to configure, for a connection with a donor node of the wireless backhaul network and via a first parent node, one or more parameters for a token for the child node that is unique to a first wireless link between the child node and the first parent node, receive the token from the first parent node over the first wireless link of the wireless backhaul network indicating that a triggering event has occurred for a second wireless link between the first parent node and a second parent node, and verify the integrity of the received token based on the configured one or more parameters for the token.

Another apparatus for wireless communication at a child node of a wireless backhaul network is described. The apparatus may include means for configuring, for a connection with a donor node of the wireless backhaul network and via a first parent node, one or more parameters for a token for the child node that is unique to a first wireless link between the child node and the first parent node, receiving the token from the first parent node over the first wireless link of the wireless backhaul network indicating that a triggering event has occurred for a second wireless link between the first parent node and a second parent node, and verifying the integrity of the received token based on the configured one or more parameters for the token.

A non-transitory computer-readable medium storing code for wireless communication at a child node of a wireless backhaul network is described. The code may include instructions executable by a processor to configure, for a connection with a donor node of the wireless backhaul network and via a first parent node, one or more parameters for a token for the child node that is unique to a first wireless link between the child node and the first parent node, receive the token from the first parent node over the first wireless link of the wireless backhaul network indicating that a triggering event has occurred for a second wireless link between the first parent node and a second parent node, and verify the integrity of the received token based on the configured one or more parameters for the token.

Some examples of the method, apparatuses, and non-transitory computer-readable medium described herein may further include operations, features, means, or instructions for selecting a third parent node of the wireless backhaul network based on receiving the token and the verifying, and establishing a third wireless link with the third parent node.

Some examples of the method, apparatuses, and non-transitory computer-readable medium described herein may further include operations, features, means, or instructions for configuring, for a new connection via the third parent node, a new token for the child node that may be unique to the third wireless link between the third parent node and the child node.

In some examples of the method, apparatuses, and non-transitory computer-readable medium described herein, configuring the one or more parameters for the token may include operations, features, means, or instructions for identifying one or more security keys shared between the child node and the donor node, and configuring the one or more parameters for the token based on the one or more security keys.

In some examples of the method, apparatuses, and non-transitory computer-readable medium described herein, the one or more parameters for the token may be configured based on a first parent node identifier, a first parent node physical cell identifier, a parameter for a connection between the child node and the first parent node, or a combination thereof.

In some examples of the method, apparatuses, and non-transitory computer-readable medium described herein, the token may be received from the first parent node using a uni-cast transmission, or a broadcast transmission, or a control channel transmission, or a data channel transmission, or a combination thereof.

In some examples of the method, apparatuses, and non-transitory computer-readable medium described herein, the second parent node includes the donor node.

In some examples of the method, apparatuses, and non-transitory computer-readable medium described herein, the second parent node may be upstream relative to the first parent node and downstream relative to the donor node.

A method of wireless communication at a donor node of a wireless backhaul network is described. The method may include configuring, during a connection establishment procedure with a child node of the wireless backhaul network, a token for the child node that is unique to a first wireless link between a first parent node and the child node and transmitting the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

An apparatus for wireless communication at a donor node of a wireless backhaul network is described. The apparatus may include a processor, memory coupled with the processor, and instructions stored in the memory. The instructions may be executable by the processor to cause the apparatus to configure, during a connection establishment procedure with a child node of the wireless backhaul network, a token for the child node that is unique to a first wireless link between a first parent node and the child node and transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

Another apparatus for wireless communication at a donor node of a wireless backhaul network is described. The apparatus may include means for configuring, during a connection establishment procedure with a child node of the wireless backhaul network, a token for the child node that is unique to a first wireless link between a first parent node and the child node and transmitting the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

A non-transitory computer-readable medium storing code for wireless communication at a donor node of a wireless backhaul network is described. The code may include instructions executable by a processor to configure, during a connection establishment procedure with a child node of the wireless backhaul network, a token for the child node that is unique to a first wireless link between a first parent node and the child node and transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

Some examples of the method, apparatuses, and non-transitory computer-readable medium described herein may further include operations, features, means, or instructions for determining that the child node may have selected the third parent node of the wireless backhaul network, and configuring, during a connection establishment procedure via the third parent node, a new token for the child node that may be unique to a third wireless link between the third parent node and the child node.

Some examples of the method, apparatuses, and non-transitory computer-readable medium described herein may further include operations, features, means, or instructions for identifying one or more security keys shared between the child node and the donor node, and configuring the token based on the one or more security keys.

In some examples of the method, apparatuses, and non-transitory computer-readable medium described herein, the configured token may be based on a first parent node identifier, a first parent node physical cell identifier, a parameter for a connection between the child node and the first parent node, or a combination thereof.

In some examples of the method, apparatuses, and non-transitory computer-readable medium described herein, the second parent node includes the donor node.

In some examples of the method, apparatuses, and non-transitory computer-readable medium described herein, the second parent node may be upstream relative to the first parent node and downstream relative to the donor node.

DETAILED DESCRIPTION

Figure 1:
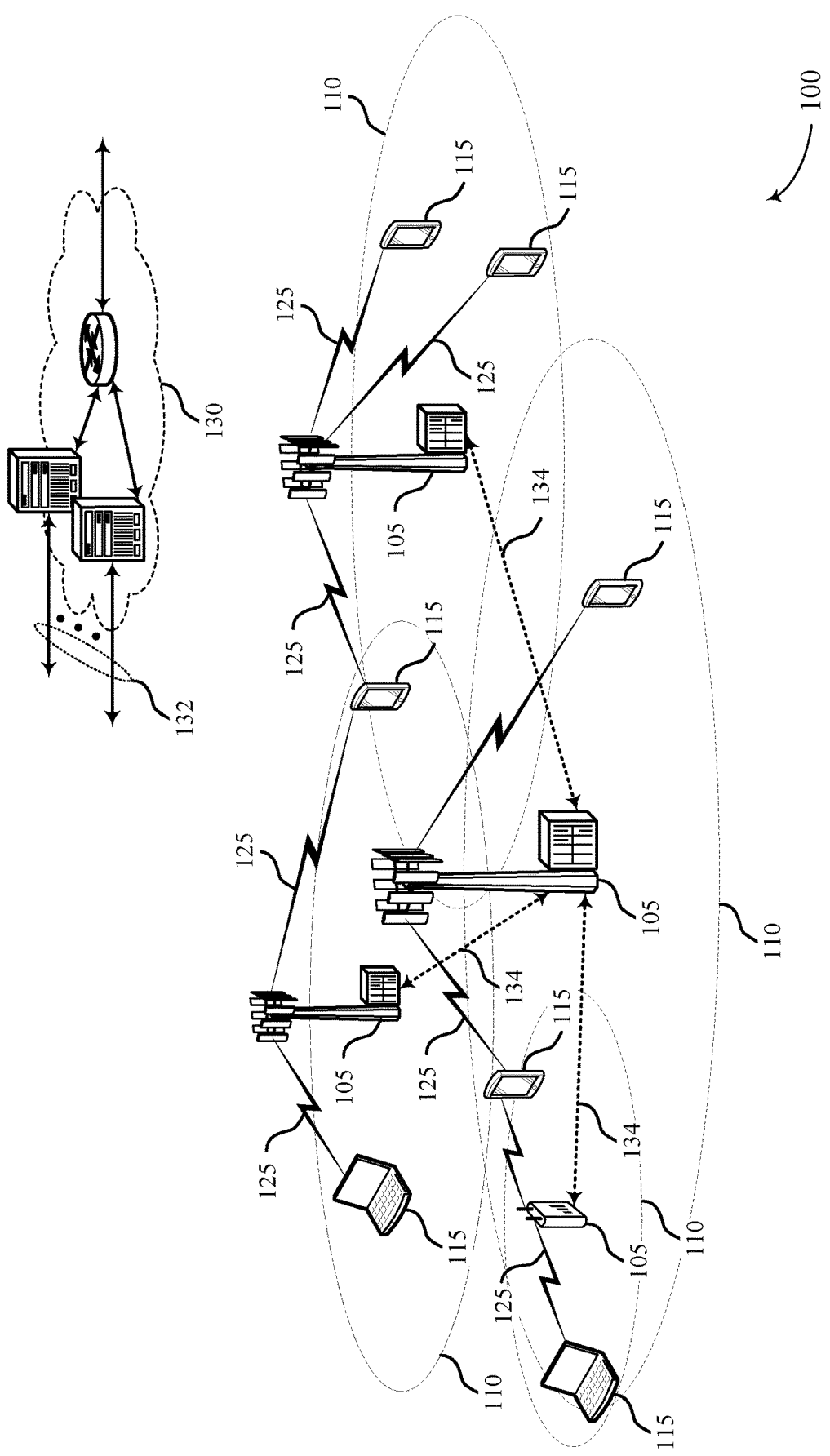
FIG. 1 illustrates an example of a system for wireless communications that supports protection of control signaling in a wireless backhaul network in accordance with aspects of the present disclosure.

Some wireless communication systems may support a wireless backhaul network, such as an integrated access and backhaul (IAB) network, that includes a donor node (e.g., an IAB donor (or anchor) node) and one or more relay nodes downstream from the donor node. In some aspects, an IAB network shares resources between access and backhaul links. Generally, the IAB donor node (which may also be referred to as an anchor node) is an access node having a wireline connection (e.g., fiber connection) to the core network. The donor node may have a central unit (CU) function that is a central entity that controls or otherwise configures resources within the IAB network. The donor node may also have a distributed unit (DU) function(s) that serves as a scheduling node to schedule child nodes (e.g., downstream nodes) of the IAB donor node. Downstream from the IAB donor node may include one or more IAB nodes (also referred to as parent nodes, relay nodes, and/or child nodes, depending upon where the node is within the IAB network) within the IAB network, with each relay node constituting a hop within the IAB network.

Each IAB node may relay traffic from a donor node through one or more hops (e.g., relay nodes or IAB nodes). In one example, some IAB node may have the DU function (e.g., a first communication link interface) and a mobile termination (MT) function (e.g., a second communication link interface). The DU function of the relay node may act as a scheduling node that schedules child nodes of this particular relay node, which may be a UE and/or a downstream child node (e.g., a UE and/or a base station within the IAB network). The MT function may serve as a scheduled node similar to a UE that is scheduled by its parent node. In this context, the parent node may be a donor node (e.g., an anchor node) or a parent node within the IAB network (e.g., an upstream wireless node from the perspective of the relay node). Similarly, a child node may include a downstream relay node within the IAB network from the perspective of an upstream donor node or parent node.

Aspects of the disclosure are initially described in the context of a wireless communication system. Generally, the described techniques provide for various mechanisms to ensure the integrity of control signaling between nodes of a wireless backhaul network, such as an IAB network. Broadly, aspects of the described techniques may include a node (which may be referred to as a child node in this context) exchanging one or more security keys, physical or fixed parameters of its parent node, and the like, with a donor node in order to configure a token (and/or parameter(s) for the token). The token is configured such that it is unique to a wireless link between the child node and its first parent node (e.g., the first upstream node within the wireless backhaul network that the child node connects to in order to establish a link to the donor node). The donor node may provide the token (or parameter(s) associated with or otherwise identifying the token) to the first parent node of the child node. The first parent node may maintain the token until it detects or otherwise determines that a triggering event has occurred. The triggering event may be with respect to any upstream wireless link of the first parent node, such as a second wireless link between the first parent node and a second parent node. In this context, the second parent node may be any upstream parent node from the perspective of the first parent node, e.g., a parent node between the first parent node in the donor node. In some examples, the second parent node may be the donor node.

Upon detecting the triggering event, the first parent node may transmit the token to the child node over the first wireless link to indicate or otherwise convey information directing the child node to select a third parent node (e.g., a new parent node) in the wireless backhaul network. The child node may use the configured one or more parameters and/or the configured token to verify the integrity of the token received from the first parent node. For example, the child node may confirm that the token received from the first parent node matches or otherwise corresponds to the token (and/or token parameter(s)) configured with the donor node. The triggering event may include any event the causes the child node to disconnect from the first parent node in order to select a new parent node, e.g., such as a radio link failure (RLF) for the second wireless link, that the performance of the second wireless link has deteriorated to such a point that it satisfies (or fails to satisfy) a threshold value, and the like. Once the child node verifies the integrity of the token received from the first parent node, the child node may select a third parent node (e.g., a new parent node) to connect to and configure (with the donor node) a new token unique to the connection between the child node and the new parent node. Accordingly, the token provides a mechanism by which the integrity of the control information (e.g., the indication that the triggering event has occurred and/or an instruction to the child node to tune to a new parent node) received from the first parent node is verified by the child node.

Aspects of the disclosure are further illustrated by and described with reference to apparatus diagrams, system diagrams, and flowcharts that relate to protection of control signaling in a wireless backhaul network.

FIG. 1 illustrates an example of a wireless communication system 100 that supports protection of control signaling in a wireless backhaul network in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and/or base station 105, when configured as a first parent node in a wireless backhaul network, may receive, from a donor node of the wireless backhaul network, a token for a child node of the wireless backhaul network, the token being unique to a first wireless link between the first parent node and the child node. The UE 115 and/or base station 105 may determine that a triggering event has occurred for a second wireless link between the first parent node and a second parent node. The UE 115 and/or base station 105 may transmit, in response to determining that the triggering event has occurred, the token to the child node over the first wireless link to indicate for the child node to select a third parent node of the wireless backhaul network.

A UE 115 and/or base station 105, when configured as a child node in a wireless backhaul network, may configure, for a connection with a donor node of the wireless backhaul network and via a first parent node, one or more parameters for a token for the child node that is unique to a first wireless link between the child node and the first parent node. The UE 115 and/or base station 105 may receive the token from the first parent node over the first wireless link of the wireless backhaul network indicating that a triggering event has occurred for a second wireless link between the first parent node and a second parent node. The UE 115 and/or base station 105 may verify the integrity of the received token based on the configured one or more parameters for the token.

A UE 115 and/or base station 105, when configured as a donor node in a wireless backhaul network, may configure, during a connection establishment procedure with a child node of the wireless backhaul network, a token for the child node that is unique to a first wireless link between a first parent node and the child node. The UE 115 and/or base station 105 may transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

Figure 2:
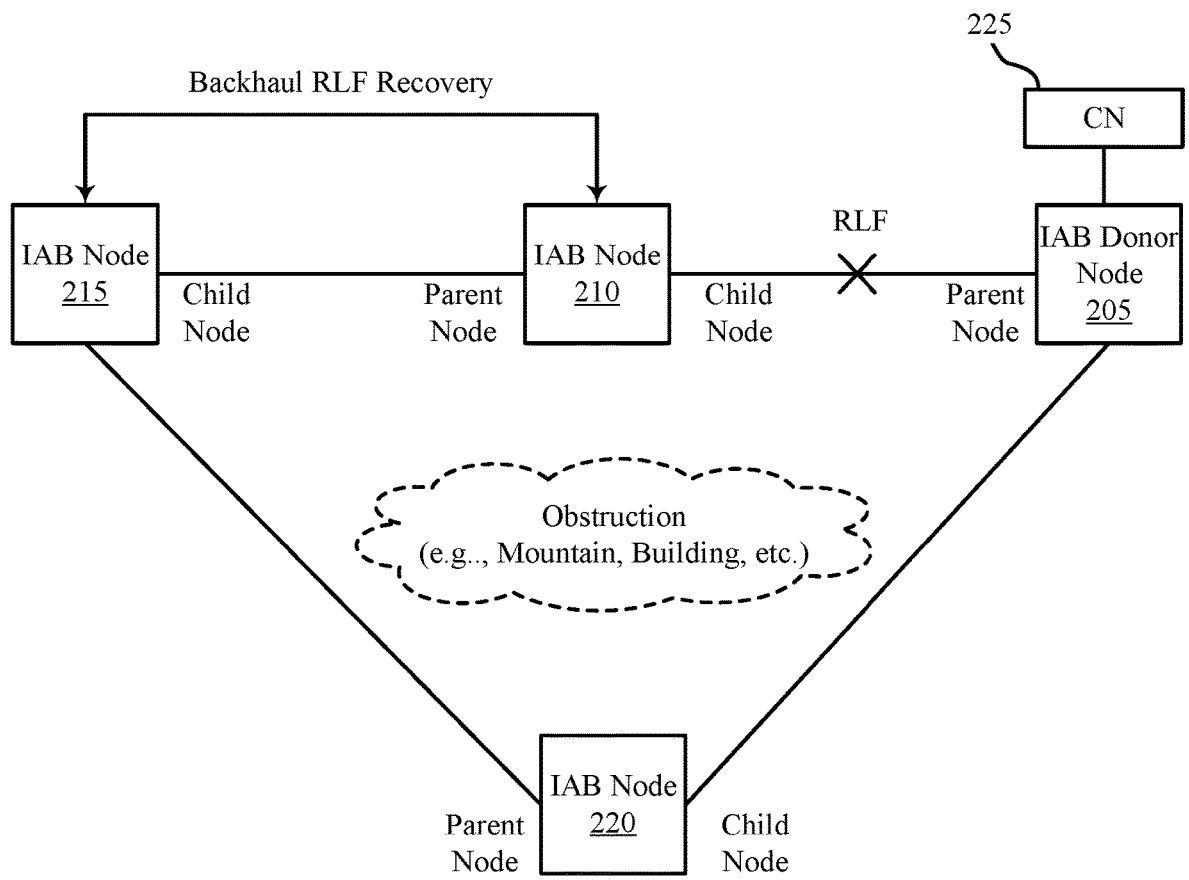
FIG. 2 illustrates an example of a wireless communication system that supports protection of control signaling in a wireless backhaul network in accordance with aspects of the present disclosure.

FIG. 2 illustrates an example of a wireless communication system 200 that supports protection of control signaling in a wireless backhaul network in accordance with aspects of the present disclosure. In some examples, wireless communication system 200 may implement aspects of wireless communication system 100. Wireless communication system 200 may include an IAB donor node 205, IAB node 210, IAB node 215, and IAB node 220, which may be examples of a UE and/or base station as described herein. That is, each of nodes 205-220 may be nodes within an IAB network being implemented at a base station and/or UE, which may be examples of the corresponding devices described herein. In some aspects, IAB donor node 205 has a wireline connection to the core network 225, such as a fiber link, and the connections between IAB donor node 205, IAB node 210, IAB node 215, and IAB node 220 may be wireless connections (links). In some aspects, wireless communication system 200 illustrates one example of a wireless backhaul network, such as an IAB network.

Multiple IAB nodes may be connected in line to improve coverage of the IAB network, where for a certain IAB node, the node closer to the IAB donor node 205 (e.g., an upstream node) is called its parent node, and the one on the other side (e.g., a downstream node) is called its child node. Thus, IAB node 210 may be closer to IAB donor node 205 than IAB node 215. Accordingly, IAB node 210 may be a parent node with respect to IAB node 215. In some aspects, IAB node 210 may be a donor node or may simply be an upstream relay node within the IAB network from the perspective of IAB node 215. IAB node 215 may be considered a child node from the perspective of IAB node 210. For ease of illustration only, references to a child node herein may refer to IAB node 215, references to a first parent node may refer to IAB node 210, references to a third parent node may refer to IAB node 220, and references to a donor node may refer to IAB donor node 205. That is, IAB node 210 is a parent node (e.g., is upstream) from the perspective of IAB node 215 and a child node from the perspective of donor node 205.

In some aspects, the wireless backhaul network (such as wireless communication system 200) may support a directed acyclic graph (DAG) topology underneath the IAB donor node 205. Each IAB donor DU function may support multiple IAB nodes. Each IAB node can support multiple child IAB nodes. Each IAB node may have up to two parent nodes. In some aspects, an IAB node may hold or otherwise manage one or more routing functions within the IAB network.

As discussed above, the IAB donor node 205 may have a CU function that is a central entity that controls or otherwise configures resources within the IAB network. The IAB donor node 205 may also have DU function(s) that serves as a scheduling node to schedule child nodes (e.g., downstream IAB nodes) of the IAB donor node 205. Downstream from the IAB donor node 205 includes one or more IAB nodes within the IAB network, with each IAB node constituting a hop within the IAB network.

Each IAB node may relay traffic from IAB donor node 205 through one or more hops (e.g., IAB nodes), and vice versa. In one example, each IAB node may have the DU function (e.g., a first communication link interface) and a MT function (e.g., a second communication link interface). The DU function of the IAB node may act as a scheduling node that schedules child nodes of this particular IAB node, which may be a UE and/or a downstream child node (e.g., a UE and/or a base station within the IAB network). The MT function may serve as a scheduled node similar to a UE that is scheduled by its parent node. In this context, the parent node may be the IAB donor node 205 (e.g., an anchor node) or a parent node within the IAB network (e.g., an upstream IAB node from the perspective of the child node). Similarly, a child node may include a downstream IAB node within the IAB network from the perspective of an upstream donor node or upstream parent node.

As discussed, each node within the IAB network may relay traffic upstream (e.g., in the direction from IAB node 215 towards IAB donor node 205) and/or downstream (e.g., in the direction from IAB donor node 205 towards IAB node 215) within the IAB network. The traffic may include access traffic (e.g., for UE(s) connected to one of IAB nodes 210, 215, and/or 220 and/or backhaul traffic (e.g., between the IAB nodes of the IAB network). This may include various control signaling exchanged between the nodes of the IAB network. Within the context of the present disclosure, the control signaling may refer to any signaling which may cause or warrant a child node to reselect to a new parent node within the IAB network. For example, the control signaling may be an instruction to perform a cell reselection procedure, an indication of an RLF for one or more wireless links upstream from the parent node, for a tune-away procedure performed by the child node, and the like. Broadly, the control signaling may also refer to any signaling exchanged between the nodes of an IAB network that warrants at least some degree of integrity protection.

With respect to the RLF, the backhaul RLF recovery may be achieved by some form of control message between the parent node and the child node via a backhaul adaptation protocol (BAP) layer and/or via a lower layer mechanism, such as a MAC control element (CE), RLC signaling, etc. Regardless of the frequency of the backhaul RLF recovery, in some examples, it may be needed to protect any form of control messages between the parent node and the child node. For example, a parent node may be responsible for multiple child nodes and, ultimately, to multiple UEs being served via the IAB network. If the control message from the parent node to the child node is not protected, an over-the-air attacker may trigger a backhaul RLF recovery on the child node to disrupt the IAB network. This may mean an abrupt loss of connection for a large number of UEs, short- and/or long-term link degradation, throughput reduction, a negative user experience, and the like.

Accordingly, aspects of the described techniques provide a token being established to provide some degree of security or integrity protection between IAB nodes. In some aspects, the token may be a single use token that can be discarded after use. In some aspects, the token (or use of the token) may carry or otherwise convey an indication that a child node is to tune away, perform a cell reselection, that an RLF has occurred, and the like.

In some aspects, the token may be configured for a connection with a donor node (e.g., IAB donor node 205) of the wireless backhaul network via a first parent node (e.g., IAB node 210). The token can be configured during an initial connection procedure or afterwards. For example, the child node (e.g., IAB node 215) and the donor node may exchange various security keys, physical/fixed parameters, and the like, in configuring the token.

For example, the token can be prepared for the parent node (e.g., IAB node 210, which is the parent node of IAB node 215, at least initially) during the IAB node joining procedure, e.g., when various security keys are set up between the donor node (e.g., IAB donor node 205) and the child node (e.g., IAB node 215). Examples of the security keys include, but are not limited to, $K_{gNB}/K_{eNB}$. The parent node (e.g., IAB node 210, which is initially the parent node of IAB node 215) may only use the token once (e.g., upon detecting the triggering event or otherwise signaling for the child node to reselect to a new/different parent node, such as IAB node 220). This may be because there is no need to use it multiple times as RLF (or any other triggering conditions) may change the path and subsequently change the security keys. Therefore, when the initial path is constructed (e.g., whenever IAB node 215 connects to the IAB network), the initial set of security keys (e.g., $K_{gNB}/K_{eNB}$) are established between the IAB donor 205 and the child node (e.g., IAB node 215). Alternatively, the initial set of security keys may be generated by the IAB donor 205 and provisioned at the child node (e.g., IAB node 215). The first token (or initial token) is derived for the connection between the parent IAB node 210 and IAB donor node 205 when (or during) the child node (e.g., IAB node 215) connects to the IAB network, where the token is derived based on the initial set of security keys (e.g., $K_{gNB}/K_{eNB}$) and/or other parameters. Then, the initial token is provisioned from IAB donor node 205 to the parent IAB node 210. In some examples, the parent node (e.g., IAB node 210 initially and/or IAB node 220 after IAB node 215 tunes away from IAB node 210) may not create the token because it does not know the security keys between its child node (e.g., IAB node 215) and the donor node (e.g., IAB donor node 205). As discussed, the token can be used for any control signaling indicating for the child node to tune away from the parent node, e.g., which may trigger a child node to perform a cell reselection to a new parent node in the IAB network (e.g., IAB node 215 tunes away from IAB node 210 and tunes to IAB node 220). In other examples, different or similar tokens may be used for different control signaling between a set of nodes in the IAB network. Advantages of this technique include, but are not limited to, no need for peer-to-peer security key set up between each IAB node, the token may be carried over any protocol layer (e.g., MAC, BAP, RLC, RRC, etc.), and the like.

Accordingly, the initial token may be calculated or otherwise configured by the donor node using one or more security keys that it shares with the child node. The token may be provisioned (e.g., transmitted or otherwise provided to) the parent node of the child node (e.g., via RRC signaling). Accordingly, the parent node may not know the security keys, but only has the token that can be verified by its child node. Of course, a parent node having multiple child nodes may be provisioned with a token unique to, and for each respective child node. Moreover, new token(s) can be established whenever an IAB node tunes away from one parent IAB node and to a new parent IAB node in the IAB network (e.g., whenever there is a path change within the IAB network from the perspective of the child IAB node).

In order to calculate or otherwise configure the token for the child node, the donor node may negotiate an integrity protection algorithm with the child node using one or more of the following inputs (e.g., parameters): an identifier for the first parent node (e.g., parent Cell-ID), a first parent node physical cell identifier (PCI) (e.g., parent PCI), a parameter for connection between a child node in the parent node parent (e.g., any physical parameter bound to the parent cell), and the like, alone or in any combination. In some aspects, this may include setting a security key to $K_{RRCint}$, setting all bearer bits to 1, setting a direction bit to 1, and setting all count bits to 1. In some aspects, the token may be the X least significant bits of the output of the integrity algorithm, where X is a positive integer. In some aspects, a keyed hash or hash message authentication code (HMAC) can be used to calculate the token.

Accordingly, the donor node (e.g., IAB donor node 205) may configure or otherwise calculate the token with the child node (e.g., IAB node 215). The donor node may then transmit or otherwise provide the configured token to the first parent node (e.g., IAB node 210, which is initially a parent node from the perspective of IAB node 215) of the wireless backhaul network. As discussed, the token may be used by the first parent node to carry or otherwise convey an indication for the child node to select a third parent node (e.g., a new/different parent node, which may be IAB node 220). The token may be used based on the first parent node determining that a triggering event (e.g., an RLF, tune-away procedure, etc.) has occurred for a second wireless link between the first parent node and a second parent node. In this example, the second parent node is the IAB donor node 205. In other examples, the second parent node may simply be an upstream parent node from the perspective of the first parent node (e.g., from the perspective of IAB node 210). In some aspects, the donor node may provision, transmit, or otherwise provide the token to the child node in a MAC CE, BAP signaling, RLC signaling, and the like.

The first parent node (e.g., IAB node 210) may determine that the triggering event has occurred for the second wireless link between the first parent node and the second parent node. In the example illustrated in wireless communication system 200, the triggering event may refer to an RLF detected for the wireless link between IAB node 210 (e.g., the first parent node) and IAB donor node 205 (e.g., the donor node). For example, the RLF may be due to interference, blockage, congestion, obstruction, and the like, for the second wireless link.

In response to determining that the triggering event has occurred, the first parent node (e.g., IAB node 210 in this example) may transmit or those provide the token to the child node (e.g., IAB node 215) to indicate for the child node to select a third parent node (e.g., IAB node 220, although IAB node 210 may or may not instruct IAB node 215 to reselect to any particular new parent node) of the wireless backhaul network, e.g., to initiate a backhaul RLF recovery procedure which includes the child node reselecting to the new parent node. The first parent node may transmit the token in a unicast and/or broadcast transmission and over a control channel and/or a data channel transmission. The first parent node may discard the token after the token is transmitted to the child node (e.g., after the token is delivered to the child node, which may include one or more retransmissions of the token).

The child node (e.g., IAB node 215) may receive the token from the first parent node (e.g., IAB node 210). The child node may verify the integrity of the received token using the token (and/or one or more parameters of the token) configured between the child node and the donor node. That is, the child node may compare and/or contrast the token received from the first parent node with the token (and/or parameter(s) of the token) configured with the donor node (e.g., using the parameters) to confirm that they match completely or at least to some degree.

Based on verifying the integrity of the received token, the child node (e.g., IAB node 215) may select a third parent node (e.g., a new parent node, which is IAB node 220 in this example) and establish a third wireless link with the third parent node. Accordingly, the child node (e.g., IAB node 215) and donor node (e.g., IAB donor node 205) may establish a new set of security keys (e.g., $K_{gNB}/K_{eNB}$) between the child node and the donor node. Then a new token is established for the child node that is unique to the third wireless link between the child node and the third parent node (e.g., IAB node 220). As also discussed, the new token is then provisioned to the third parent node for the child node. That is, the child node (e.g., IAB node 215) and the donor node (e.g., IAB donor node 205) may configure the new token that is unique to the connection between the child node and the new parent node (e.g., the connection between IAB node 215 and IAB node 220). The donor node may then provide the newly established token (e.g., the token itself and/or parameter(s) associated with the token) to the new parent node (e.g., to IAB node 220). The new parent node may then use the token in the same manner as the old parent node (e.g., the previous parent node, which is IAB node 215 in this example), as discussed above.

Figure 3:
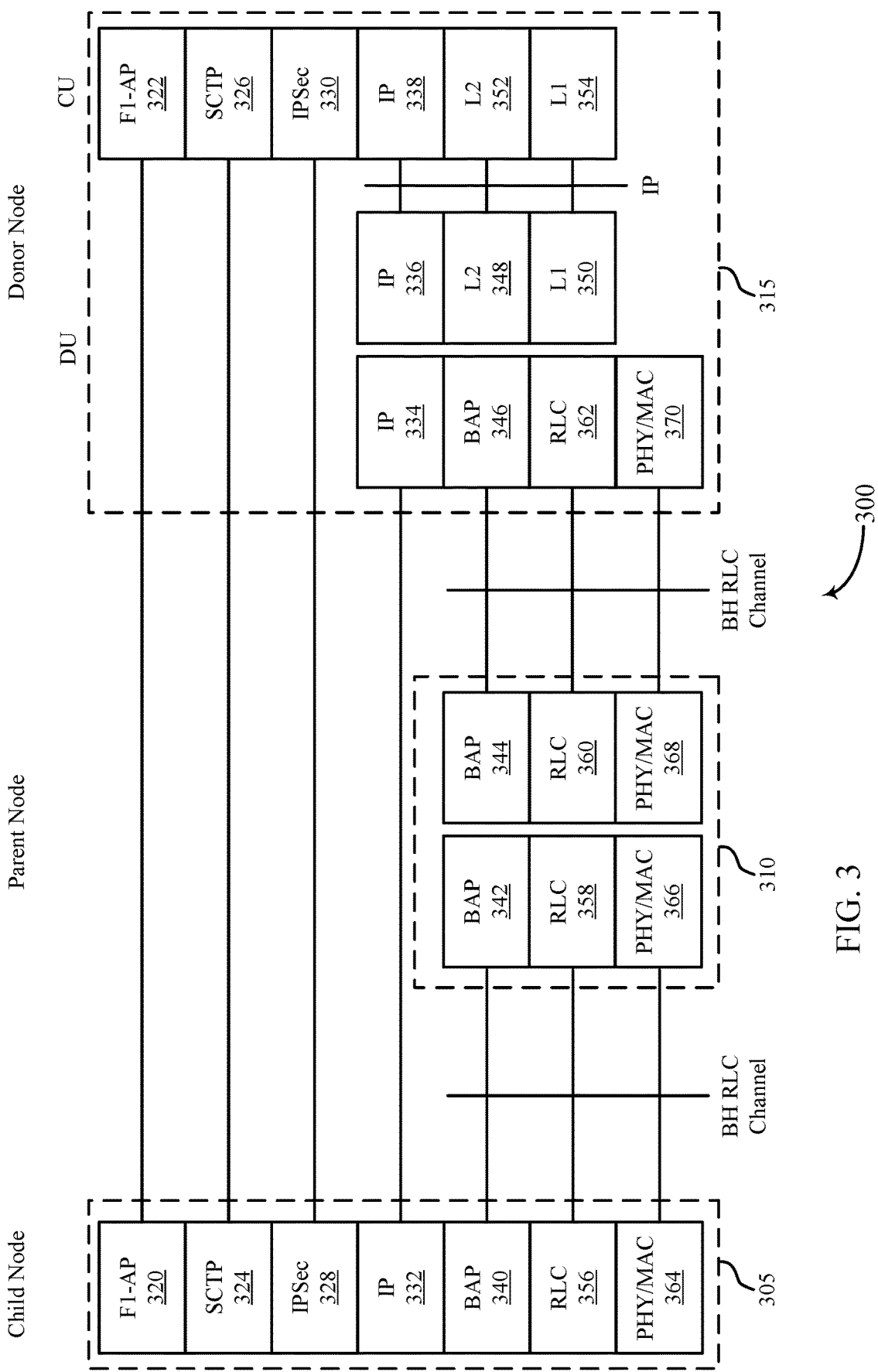
FIG. 3 illustrates an example of a protocol stack that supports protection of control signaling in a wireless backhaul network in accordance with aspects of the present disclosure.

FIG. 3 illustrates an example of a protocol stack 300 that supports protection of control signaling in a wireless backhaul network in accordance with aspects of the present disclosure. In some examples, protocol stack 300 may implement aspects of wireless communication systems 100 and/or 200. Broadly, protocol stack 300 illustrates an example of a layered protocol stack between a child node 305, a parent node 310 (e.g., a first parent node), and a donor node 315, which may be examples of the corresponding device described herein. That is, child node 305, parent node 310, and/or donor node 315, may be examples of the nodes within an IAB network, which may be implemented in a UE and/or a base station, as described herein. In some aspects, protocol stack 300 illustrates an example of an F1-C protocol stack (e.g., a protocol stack for a control plane) for a wireless backhaul network, such as an IAB network. Although protocol stack 300 includes only one parent node 310, it is to be understood that there may be more parent nodes (e.g., hops) between child node 305 and donor node 315 in the IAB network.

As discussed above, the child node 305 and donor node 315 may configure a token (and/or one or more parameters for the token) for the child node 305 that is unique to the wireless link between child node 305 and parent node 310 (e.g., the first parent node). The token may be configured using various security keys, physical parameters associated with the parent node 310, and the like. The token may be transmitted or otherwise provided to the parent node 310 for use once a triggering event has been detected by parent node 310. The triggering event may include any event which may require or warrant the child node 305 to reselect to a new parent node (e.g., a third parent node within the wireless backhaul network that is upstream from the child node 305 perspective and downstream from the donor node 315 perspective). For example, the triggering event may include an RLF, a tune-away procedure, or channel performance metric, etc., for an upstream wireless link. Once the parent node 310 detects or otherwise determine that the triggering event has occurred for the upstream wireless link, parent node 310 may transmit the token to the child node 305, which then verifies the integrity of the token received from parent node 310 using the token (and/or one or more parameters for the token) configured with the donor node 315. The child node 305 may, based on verifying the integrity of the control signal carrying or otherwise conveying an indication of the token, then reselect to a new parent node (e.g., a third parent node) within the wireless backhaul network.

As also discussed above, in some examples, the donor node 315 may employ a CU/DU split, where the CU function serves as a central entity that controls or otherwise configures resources within the IAB network. The donor node 315 may also have DU function(s) that serves as a scheduling node(s) to schedule child nodes (e.g., downstream nodes) of the donor node 315.

Broadly, protocol stack 300 illustrates an example of a layered protocol stack that may be established between child node 305 and donor node 315 in an IAB network. For example, the F1-application protocol (AP) stack 320 of child node 305 may establish a connection with the F1-AP stack 322 of the CU function of donor node 315. The F1-AP stacks support the functions of the F1 interface using various signaling procedures, e.g., may monitor, configure, or otherwise manage one or more elementary procedures (EPs). The stream control transmission protocol (SCTP) stack 324 of child node 305 may establish a connection with the SCTP stack 326 of the CU function of donor node 315. The SCTP stacks may manage one or more aspects of the connection setup, reconfiguration, and release between the child node 305 and the donor node 315.

The IP security (IPSec) stack 328 of child node 305 may establish a connection with the IPSec stack 330 of the CU function of donor node 315. The IPSec stacks may monitor, control, or otherwise manage aspects of creation and/or management of authentication and cryptographic secured tunnels for sending data between the nodes. In some aspects, the IPSec stacks may manage one or more aspects of creating or otherwise configuring the token (and/or parameter(s) for the token) for the child node 305 that is unique to the first wireless link between the first parent node (e.g., parent node 310) and child node 305. The token may be configured using the connection (e.g., during an initial connection establishment procedure and/or after the connection has been established) between the IPSec stacks of child node 305 and the CU function of donor node 315.

The IP stack 332 of child node 305 may establish a connection with the IP stack 334 of the DU function of donor node 315. The IP stack 336 of the DU function of donor node 315 may (e.g., based on internal communications with the IP stack 334) establish a connection with IP stack 338 of the CU function of donor node 315. The IP stacks may monitor, control, or otherwise manage, aspects of IP traffic between child node 305 and the DU/CU functions of donor node 315.

The BAP stack 340 may establish a connection with the BAP stack 342 of donor node 315 which may communicate with the BAP stack 344 of donor node 315, which is connected to the BAP stack 346 of the DU function of donor node 315. In some aspects, the BAP stacks may monitor, control, or otherwise manage one or more aspects of the backhaul communications between child node 305 and parent node 310 and between parent node 310 and the DU function of donor node 315. For example, efficient multi-hop forwarding of traffic within the wireless backhaul network may be enabled via the BAP stacks. In some aspects, the BAP stacks may manage one or more aspects of communicating the token information from parent node 310 to child node 305 upon detecting the triggering event occurrence and/or for provisioning the token from donor node 315 to parent node 310.

The layer two (L2) stack 348 and the layer one (L1) stack 350 of the DU function of donor node 315 may establish a connection with the corresponding L2 stack 352 and L1 stack 354, respectively, of the CU function of donor node 315. Generally, the L2 stacks may include sub-stacks, such as RLC stacks, MAC stacks etc. The L1 stacks may monitor, control, or otherwise manage one or more aspects of the physical channel communications.

Returning to the child node 305, the RLC stack 356 of child node 305 may establish a connection with the RLC stack 358 parent node 310, which may be in communication with the RLC stack 360 of donor node 315 that has a connection established with the RLC stack 362 of the DU function of donor node 315. The RLC stacks may monitor, control, or otherwise manage one or more aspects of controlling the radio link between the child nodes 305 and parent node 310 and between the parent node 310 and the DU function of donor node 315. In some aspects, the RLC stacks may manage one or more aspects of communicating the token information from parent node 310 to child node 305 upon detecting the triggering event occurrence and/or for provisioning the token from the donor node 315 to the parent node 310.

The PHY/MAC stack 364 of child node 305 may establish a connection with the PHY/MAC stack 366 of parent node 310, which may communicate with the PHY/MAC stack 368 of parent node 310 that is connected to the PHY/MAC stack 370 of the DU function of donor node 315. The PHY/MAC stacks may manage one or more aspects of the MAC protocol stack and/or PHY protocol stack communications between child node 305 and parent node 310 and between parent node 310 and the DU function of donor node 315. In some aspects, the PHY/MAC stacks may manage one or more aspects of communicating the token information from parent node 310 to child node 305 upon detecting the triggering event occurrence and/or for provisioning the token from the donor node 315 to the parent node 310.

It is to be understood that references to one stack establishing a connection with another stack implemented in a different node in accordance with the present description may refer to a logical connection, rather than in a physical connection. For example, the RLC stack 356 may establish a logical connection with the RLC stack 358, the BAP stack 344 may establish a logical connection with the BAP stack 346, and so forth. The logical connection may create a corresponding entity that manages one or more aspects of the functions performed by the respective stacks. For example, the RLC stack 360 may establish a logical connection with the RLC stack 362 in order to create an RLC entity from the perspective of the parent node 310 and the donor node 315. In another example, the SCTP stack 324 may establish a logical connection with the SCTP stack 326 in order to create an SCTP entity from the perspective of the child node 305 and the donor node 315.

Accordingly, aspects of the described techniques may include one or more stacks of the child node 305 configuring one or more parameters for a token (or simply the token) for the child node 305 that is unique to the wireless link between the child node 305 and the parent node 310. As discussed, the token may be established or otherwise configured at one or more of the stacks of child node 305 having a logical connection with the corresponding stack of donor node 315, e.g., at the F1-AP stacks, the SCTP stacks, the IPSec stacks, and/or the IP stacks. The token may then be provided to the parent node 310 (e.g., the first parent node from the perspective of child node 305) to use when the occurrence of a triggering event is detected. Once the triggering event is detected, one or more of the stacks of parent node 310 may transmit or otherwise provide an indication of the token to the corresponding stack(s) of the child node 305, e.g., the BAP stacks, the RLC stacks, and/or the PHY/MAC stacks. The child node 305 may verify the integrity of the token (at the IPSec stack 328, as one non-limiting example) using the token (and/or the one or more parameters for the token) configured with the donor node 315. Once the integrity is verified, child node 305 may, with the donor node 315, configure a new token that is unique to the wireless link between the child node 305 and the new parent node (e.g., a third parent node).

Figure 4:
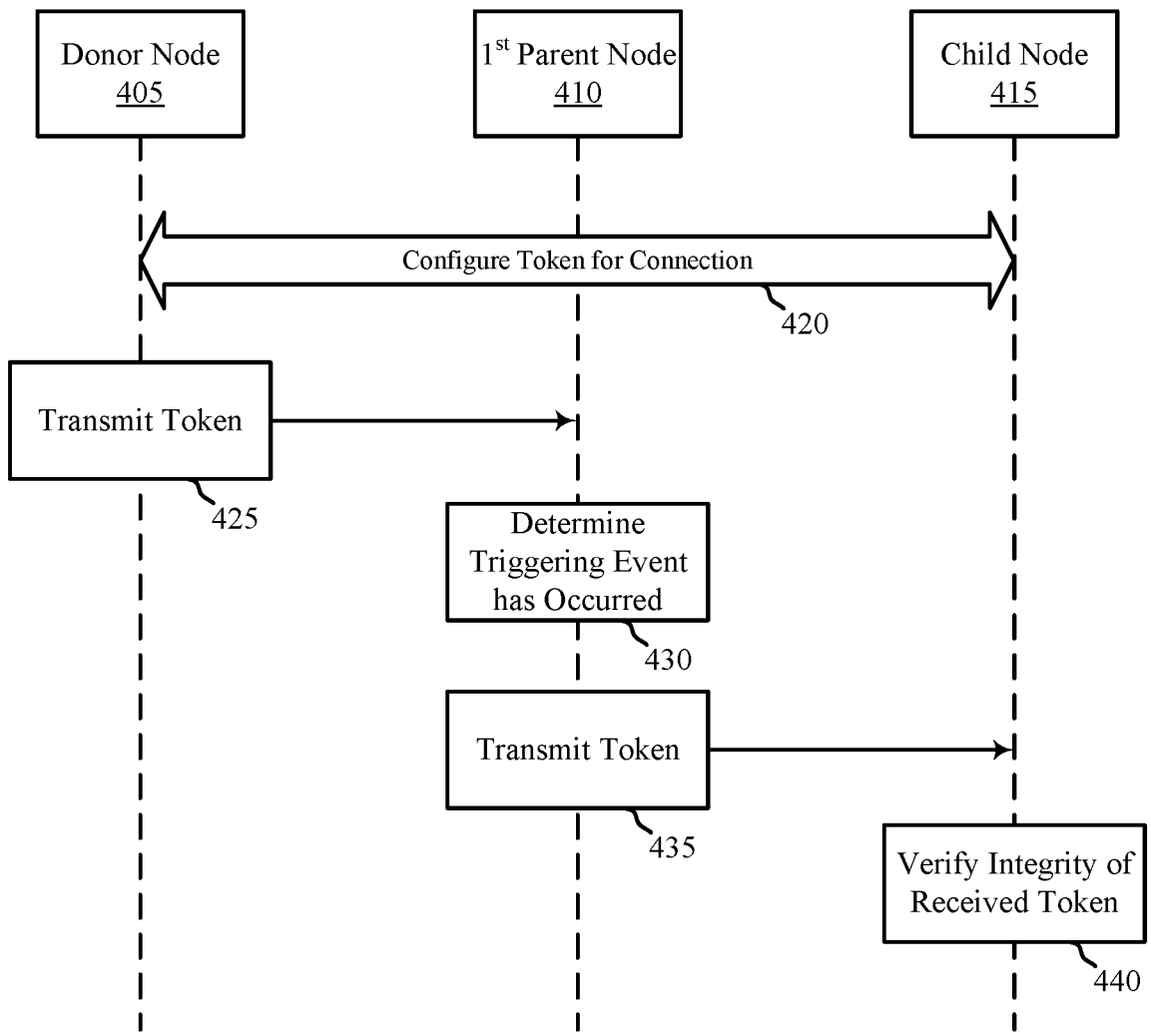
FIG. 4 illustrates an example of a process that supports protection of control signaling in a wireless backhaul network in accordance with aspects of the present disclosure.

FIG. 4 illustrates an example of a process 400 that supports protection of control signaling in a wireless backhaul network in accordance with aspects of the present disclosure. In some examples, process 400 may implement aspects of wireless communication systems 100 and/or 200, and/or protocol stack 300. Aspects of process 400 may be implemented by donor node 405, first parent node 410, and child node 415, which may be examples of a UE and/or base station as described herein. That is, one or more of the donor node 405, first parent node 410, and/or child node 415 may be nodes within a wireless backhaul network (e.g., an IAB network) implemented at a UE and/or base station.

At 420, donor node 405 and child node 415 may configure, for a connection with donor node 405 and via first parent node 410, one or more parameters for a token for child node 415 that is unique to a first wireless link between child node 415 and first parent node 410. For example, the token (and/or one or more parameters for the token) may be configured based on security key(s) shared between the child node 415 and the donor node 405. Additionally or alternatively, the token (and/or one or more parameters for the token) may be configured based on physical parameters associated with the first parent node 410 (e.g., a first parent node identifier, a first parent node PCI, one or more parameters for the connection between the child node 415 and the first parent node 410, and the like).

At 425, donor node 405 may transmit (and first parent node 410 may receive) the configured token. As discussed, the token may be for the first parent node 410 to use to indicate for child node 415 to select a third parent node (not shown) of the wireless backhaul network based on the first parent node 410 determining that a triggering event has occurred for a second wireless link between the first parent node 410 and a second parent node. In this context, the second parent node may be the donor node 405 or may be an upstream node relative to the first parent node 410 and a downstream node relative to the donor node 405. That is, the second parent node in this context may refer to any node between the first parent node 410 and the donor node 405 (or may be the donor node 405 when there are no intervening IAB nodes). The token may be transmitted to the first parent node 410 in a MAC CE, BAP signaling, RLC signaling, RRC signaling, and the like.

At 430, the first parent node 410 may determine that a triggering event has occurred for the second wireless link between the first parent node 410 and the second parent node. As discussed, the triggering event may refer to any event which causes or justifies the child node 415 reselecting to a new parent node from the first parent node 410. For example, the triggering event may be based on an RLF, the child node 415 tuning away from the first parent node 410, one or more metrics (e.g., performance metrics) of the second wireless link satisfying (or reaching) a threshold value (or failing to satisfy or reach the threshold value), and the like. The performance metrics of the second wireless link may include, but are not limited to, the CSI, congestion level, a throughput, interference, etc. The first parent node 410 may discard the token after the token has been delivered to the child node 415 (e.g., which may include an initial transmission and one or more retransmissions of the token).

At 435, the first parent node 410 may transmit (and child node 415 may receive) the token over the first wireless link to carry or convey an indication for the child node 415 to select a third parent node of the wireless backhaul network (e.g., to perform a cell reselection procedure from the first parent node 410 to the third parent node), which may then become a new parent node from the perspective of child node 415. The token may be transmitted in a unicast and/or broadcast transmission and/or using control channel and/or data channel transmissions. The token may be transmitted in a MAC CE, BAP signaling, RLC signaling, and the like.

At 440, child node 415 may verify the integrity of the token received from the first parent node 410 using or otherwise based on the configured one or more parameters for the token (and/or simply the configured token) configured between donor node 405 and child node 415. If the integrity is not verified (e.g., the tokens and/or parameters do not match), child node 415 may disregard the control message carrying the token from the first parent node 410. If the integrity is verified, child node 415 may select the third parent node of the wireless backhaul network and establish a third wireless link with the third parent node (e.g., with its new parent node). Child node 415 and donor node 405 may once again configure, for the third wireless link between child node 415 and the third parent node, a new token for the child node 415 that is unique to the third wireless link between the third parent node and the child node 415. The new token may be provisioned to the third parent node for use in accordance with the described techniques.

Figure 5:
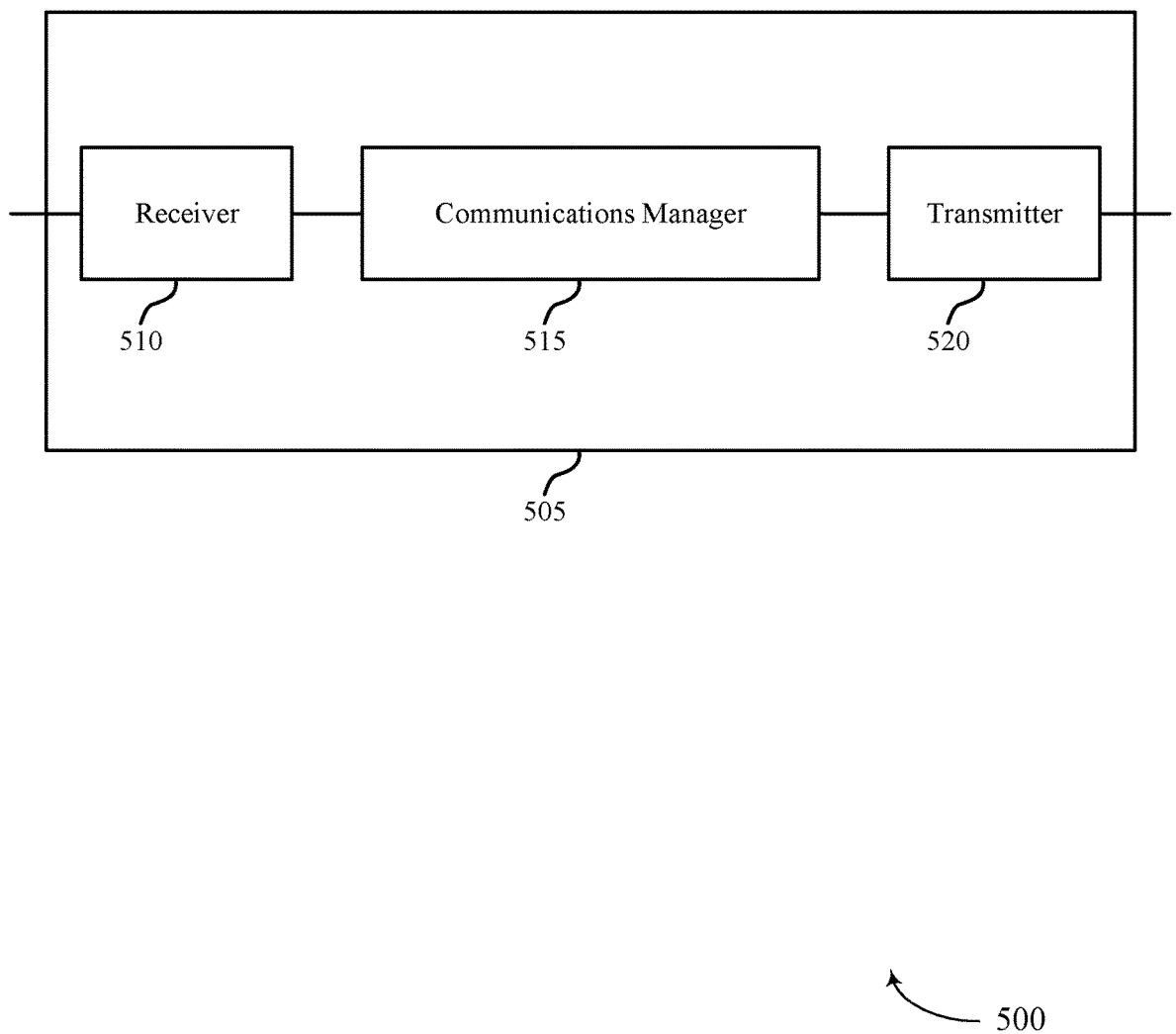
FIGS. 5 and 6 show diagrams of devices that support protection of control signaling in a wireless backhaul network in accordance with aspects of the present disclosure.

FIG. 5 shows a diagram 500 of a device 505 that supports protection of control signaling in a wireless backhaul network in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to protection of control signaling in a wireless backhaul network, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

When the device 505 is configured as a first parent node, the communications manager 515 may receive, from a donor node of the wireless backhaul network, a token for a child node of the wireless backhaul network, the token being unique to a first wireless link between the first parent node and the child node, determine that a triggering event has occurred for a second wireless link between the first parent node and a second parent node, and transmit, in response to determining that the triggering event has occurred, the token to the child node over the first wireless link to indicate for the child node to select a third parent node of the wireless backhaul network.

When the device 505 is configured as a child node, the communications manager 515 may also configure, for a connection with a donor node of the wireless backhaul network and via a first parent node, one or more parameters for a token for the child node that is unique to a first wireless link between the child node and the first parent node, receive the token from the first parent node over the first wireless link of the wireless backhaul network indicating that a triggering event has occurred for a second wireless link between the first parent node and a second parent node, and verify the integrity of the received token based on the configured one or more parameters for the token.

When the device 505 is configured as a donor node, the communications manager 515 may also configure, during a connection establishment procedure with a child node of the wireless backhaul network, a token for the child node that is unique to a first wireless link between a first parent node and the child node and transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node. The communications manager 515 may be an example of aspects of the communications manager 810 or 910 as described herein.

The communications manager 515 may be implemented as an integrated circuit or chipset for the device 505, and the receiver 510 and the transmitter 520 may be implemented as analog components (for example, amplifiers, filters, antennas) coupled with the device 505 modem to enable wireless transmission and reception The actions performed by the communications manager 515 as described herein may be implemented to realize one or more potential advantages. At least one implementation may enable the communications manager 515 to communicate a token that triggers a child node to select a new parent node of an IAB network. Based on implementing the communicating, one or more processors of the device 505 (for example, processor(s) controlling or incorporated with the communications manager 515) may promote improvements to security for communications in an IAB network and, in some examples, may promote spectral efficiency, higher data rates, and enhanced efficiency for high reliability and low latency operations, among other benefits by preventing the loss of connection or link degradation between IAB nodes.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver component. For example, the transmitter 520 may be an example of aspects of the transceiver 820 or 920 as described with reference to FIGS. 8 and 9. The transmitter 520 may utilize a single antenna or a set of antennas.

Figure 6:
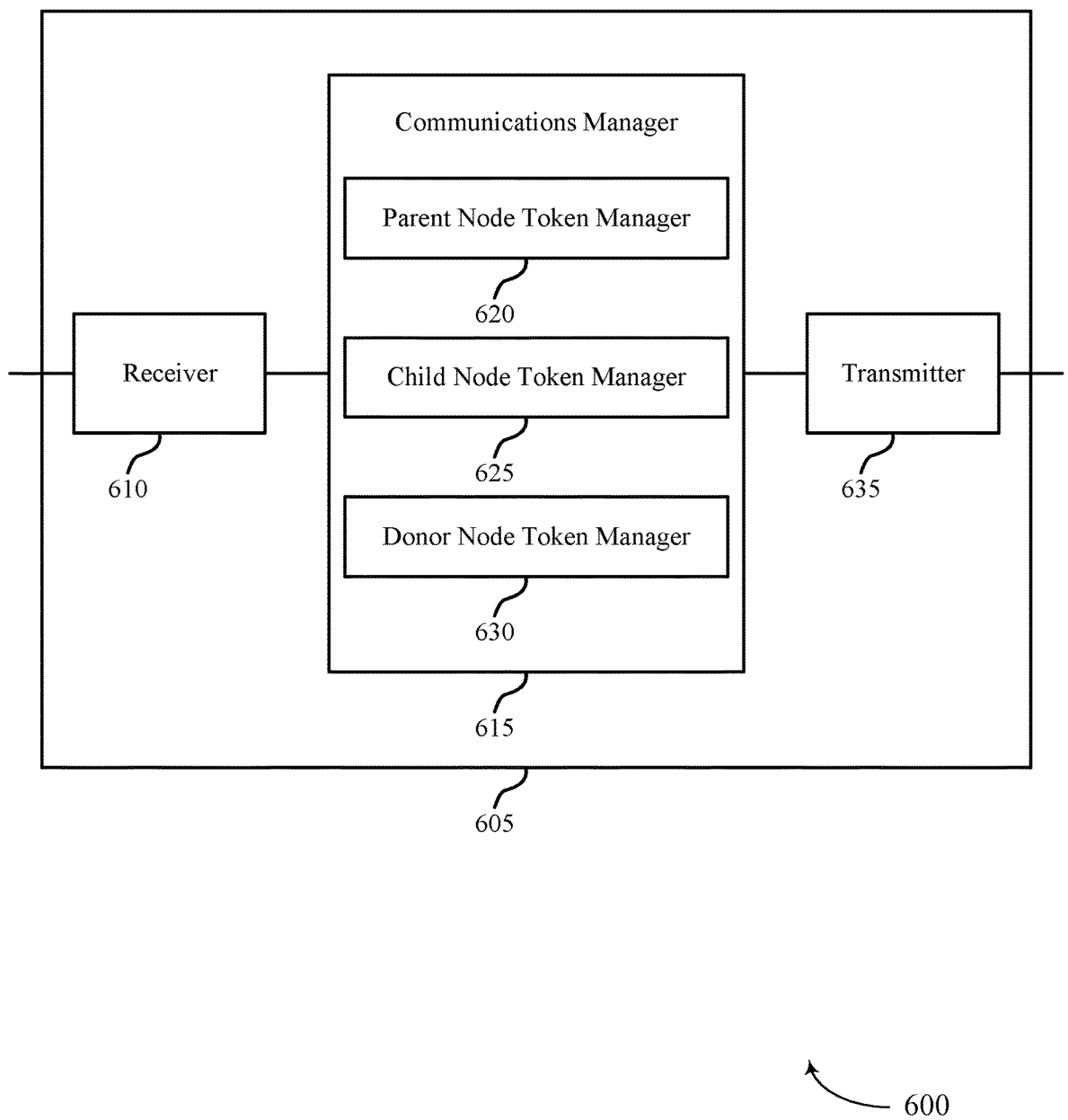

FIG. 6 shows a diagram 600 of a device 605 that supports protection of control signaling in a wireless backhaul network in accordance with aspects of the present disclosure. The device 605 may be an example of aspects of a device 505, a UE 115, or a base station 105 as described herein. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to protection of control signaling in a wireless backhaul network, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a parent node token manager 620, a child node token manager 625, and a donor node token manager 630. The communications manager 615 may be an example of aspects of the communications manager 810 or 910 as described herein.

The parent node token manager 620 may receive, from a donor node of the wireless backhaul network, a token for a child node of the wireless backhaul network, the token being unique to a first wireless link between the first parent node and the child node, determine that a triggering event has occurred for a second wireless link between the first parent node and a second parent node, and transmit, in response to determining that the triggering event has occurred, the token to the child node over the first wireless link to indicate for the child node to select a third parent node of the wireless backhaul network.

The child node token manager 625 may configure, for a connection with a donor node of the wireless backhaul network and via a first parent node, one or more parameters for a token for the child node that is unique to a first wireless link between the child node and the first parent node, receive the token from the first parent node over the first wireless link of the wireless backhaul network indicating that a triggering event has occurred for a second wireless link between the first parent node and a second parent node, and verify the integrity of the received token based on the configured one or more parameters for the token.

The donor node token manager 630 may configure, during a connection establishment procedure with a child node of the wireless backhaul network, a token for the child node that is unique to a first wireless link between a first parent node and the child node and transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

Transmitter 635 may transmit signals generated by other components of the device 605. In some examples, the transmitter 635 may be collocated with a receiver 610 in a transceiver component. For example, the transmitter 635 may be an example of aspects of the transceiver 820 or 920 as described with reference to FIGS. 8 and 9. The transmitter 635 may utilize a single antenna or a set of antennas.

Figure 7:
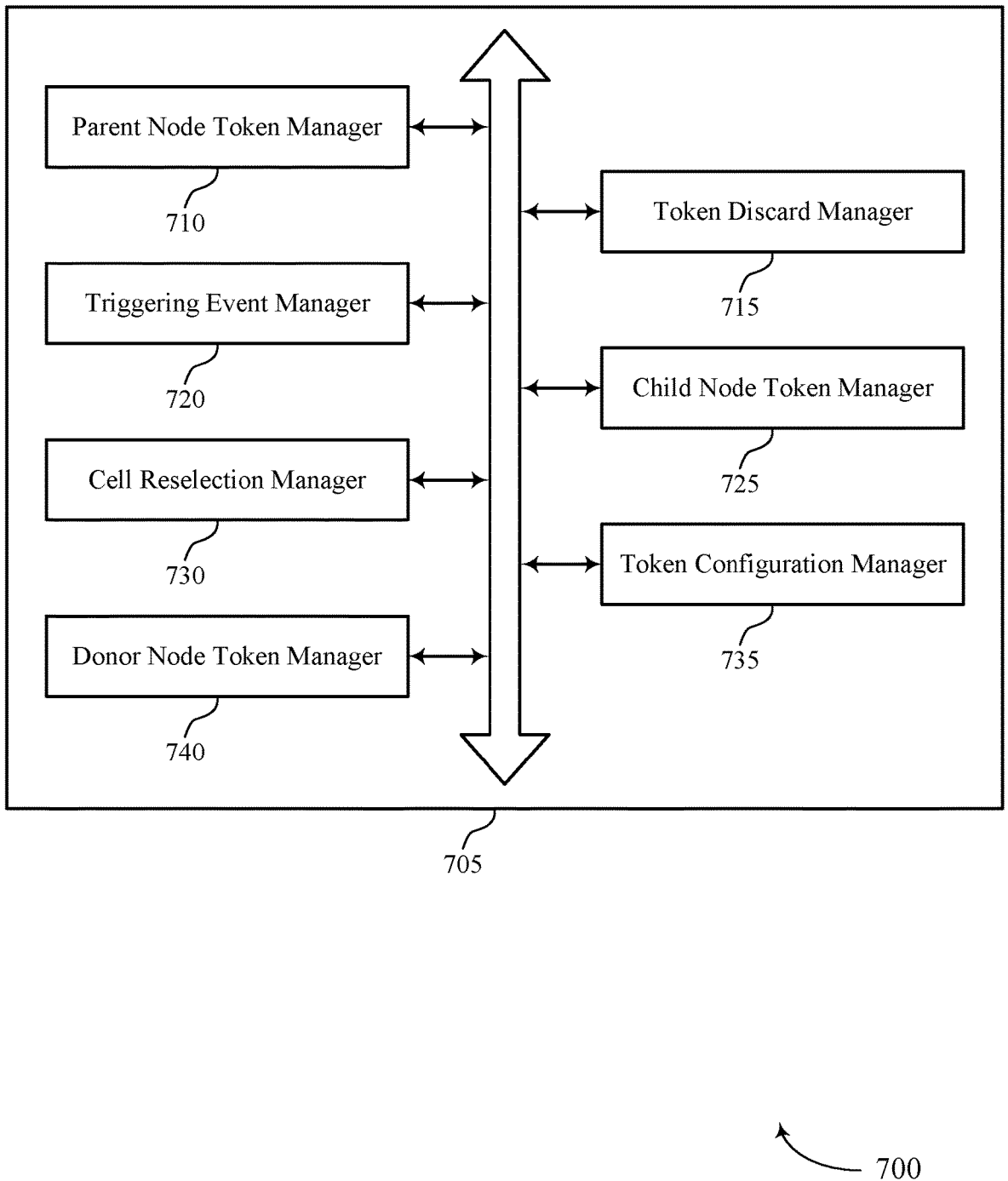
FIG. 7 shows a diagram of a communications manager that supports protection of control signaling in a wireless backhaul network in accordance with aspects of the present disclosure.

FIG. 7 shows a diagram 700 of a communications manager 705 that supports protection of control signaling in a wireless backhaul network in accordance with aspects of the present disclosure. The communications manager 705 may be an example of aspects of a communications manager 515, a communications manager 615, or a communications manager 810 described herein. The communications manager

705 may include a parent node token manager 710, a token discard manager 715, a triggering event manager 720, a child node token manager 725, a cell reselection manager 730, a token configuration manager 735, and a donor node token manager 740. Each of these components may communicate, directly or indirectly, with one another (e.g., via one or more buses).

The parent node token manager 710 may receive, from a donor node of the wireless backhaul network, a token for a child node of the wireless backhaul network, the token being unique to a first wireless link between the first parent node and the child node. In some examples, the parent node token manager 710 may determine that a triggering event has occurred for a second wireless link between the first parent node and a second parent node. In some examples, the parent node token manager 710 may transmit, in response to determining that the triggering event has occurred, the token to the child node over the first wireless link to indicate for the child node to select a third parent node of the wireless backhaul network. In some examples, the parent node token manager 710 may receive the token from the donor node in a MAC control element, or a backhaul adaptation protocol signaling, or an RLC signaling, or an RRC signaling, or a combination thereof.

In some examples, the parent node token manager 710 may transmit the token to the child node in a MAC control element, or a backhaul adaptation protocol signaling, or an RLC signaling, or a combination thereof. In some cases, the token is transmitted to the child node using a uni-cast transmission, or a broadcast transmission, or a control channel transmission, or a data channel transmission, or a combination thereof. In some cases, the second parent node includes the donor node. In some cases, the second parent node is upstream relative to the first parent node and downstream relative to the donor node.

The child node token manager 725 may configure, for a connection with a donor node of the wireless backhaul network and via a first parent node, one or more parameters for a token for the child node that is unique to a first wireless link between the child node and the first parent node. In some examples, the child node token manager 725 may receive the token from the first parent node over the first wireless link of the wireless backhaul network indicating that a triggering event has occurred for a second wireless link between the first parent node and a second parent node. In some examples, the child node token manager 725 may verify the integrity of the received token based on the configured one or more parameters for the token.

The donor node token manager 740 may configure, during a connection establishment procedure with a child node of the wireless backhaul network, a token for the child node that is unique to a first wireless link between a first parent node and the child node. In some examples, the donor node token manager 740 may transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node. In some cases, the configured token is based on a first parent node identifier, a first parent node physical cell identifier, a parameter for a connection between the child node and the first parent node, or a combination thereof.

The token discard manager 715 may discard the token after the token is delivered to the child node. The triggering event manager 720 may determine an RLF for the second wireless link, the token transmitted to the child node in response to the RLF. In some examples, the triggering event manager 720 may determine that the child node is to tune away from the first wireless link with the first parent node. In some examples, the triggering event manager 720 may determine that a metric of the second wireless link satisfies or fails to satisfy a threshold value. In some examples, the triggering event manager 720 may receive an indication that the child node is to perform a cell reselection procedure away from the first parent node.

The cell reselection manager 730 may select a third parent node of the wireless backhaul network based on receiving the token and the verifying. In some examples, the cell reselection manager 730 may establish a third wireless link with the third parent node. In some examples, the cell reselection manager 730 may configure, for a new connection via the third parent node, a new token for the child node that is unique to the third wireless link between the third parent node and the child node. In some examples, the cell reselection manager 730 may determine that the child node has selected the third parent node of the wireless backhaul network. In some examples, the cell reselection manager 730 may configure, during a connection establishment procedure via the third parent node, a new token for the child node that is unique to a third wireless link between the third parent node and the child node.

The token configuration manager 735 may identify one or more security keys shared between the child node and the donor node. In some examples, the token configuration manager 735 may configure the one or more parameters for the token based on the one or more security keys. In some examples, the token configuration manager 735 may identify one or more security keys shared between the child node and the donor node. In some examples, the token configuration manager 735 may configure the token based on the one or more security keys. In some cases, the one or more parameters for the token are configured based on a first parent node identifier, a first parent node physical cell identifier, a parameter for a connection between the child node and the first parent node, or a combination thereof.

Figure 8:
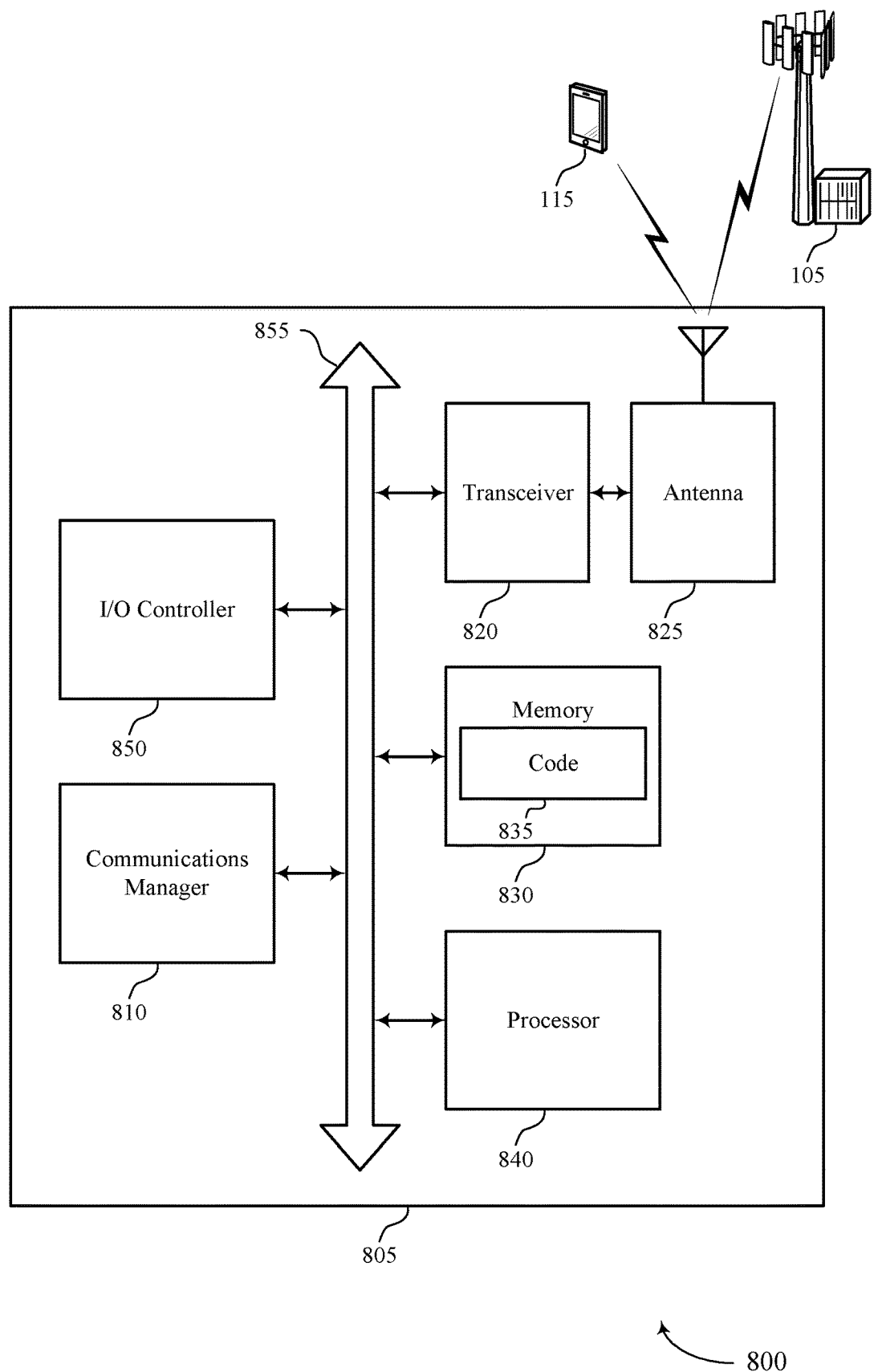
FIG. 8 shows a diagram of a system including a user equipment (UE) that supports protection of control signaling in a wireless backhaul network in accordance with aspects of the present disclosure.

FIG. 8 shows a diagram of a system 800 including a device 805 that supports protection of control signaling in a wireless backhaul network in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

When the device 805 is configured as a first parent node, the communications manager 810 may receive, from a donor node of the wireless backhaul network, a token for a child node of the wireless backhaul network, the token being unique to a first wireless link between the first parent node and the child node, determine that a triggering event has occurred for a second wireless link between the first parent node and a second parent node, and transmit, in response to determining that the triggering event has occurred, the token to the child node over the first wireless link to indicate for the child node to select a third parent node of the wireless backhaul network.

When the device 805 is configured as a child node, the communications manager 810 may also configure, for a connection with a donor node of the wireless backhaul network and via a first parent node, one or more parameters for a token for the child node that is unique to a first wireless link between the child node and the first parent node, receive the token from the first parent node over the first wireless link of the wireless backhaul network indicating that a triggering event has occurred for a second wireless link between the first parent node and a second parent node, and verify the integrity of the received token based on the configured one or more parameters for the token.

When the device 805 is configured as a donor node, the communications manager 810 may also configure, during a connection establishment procedure with a child node of the wireless backhaul network, a token for the child node that is unique to a first wireless link between a first parent node and the child node and transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

At least one implementation may enable to communications manager 810 to communicate a token that triggers a child node to select a new parent node of an IAB network. Based on implementing the communicating, one or more processors of the device 805 (for example, processor(s) controlling or incorporated with the communications manager 810) may promote improvements to security for communications in an IAB network and, in some examples, may promote spectral efficiency, higher data rates, and enhanced efficiency for high reliability and low latency operations, among other benefits by preventing the loss of connection or link degradation between IAB nodes.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting protection of control signaling in a wireless backhaul network).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
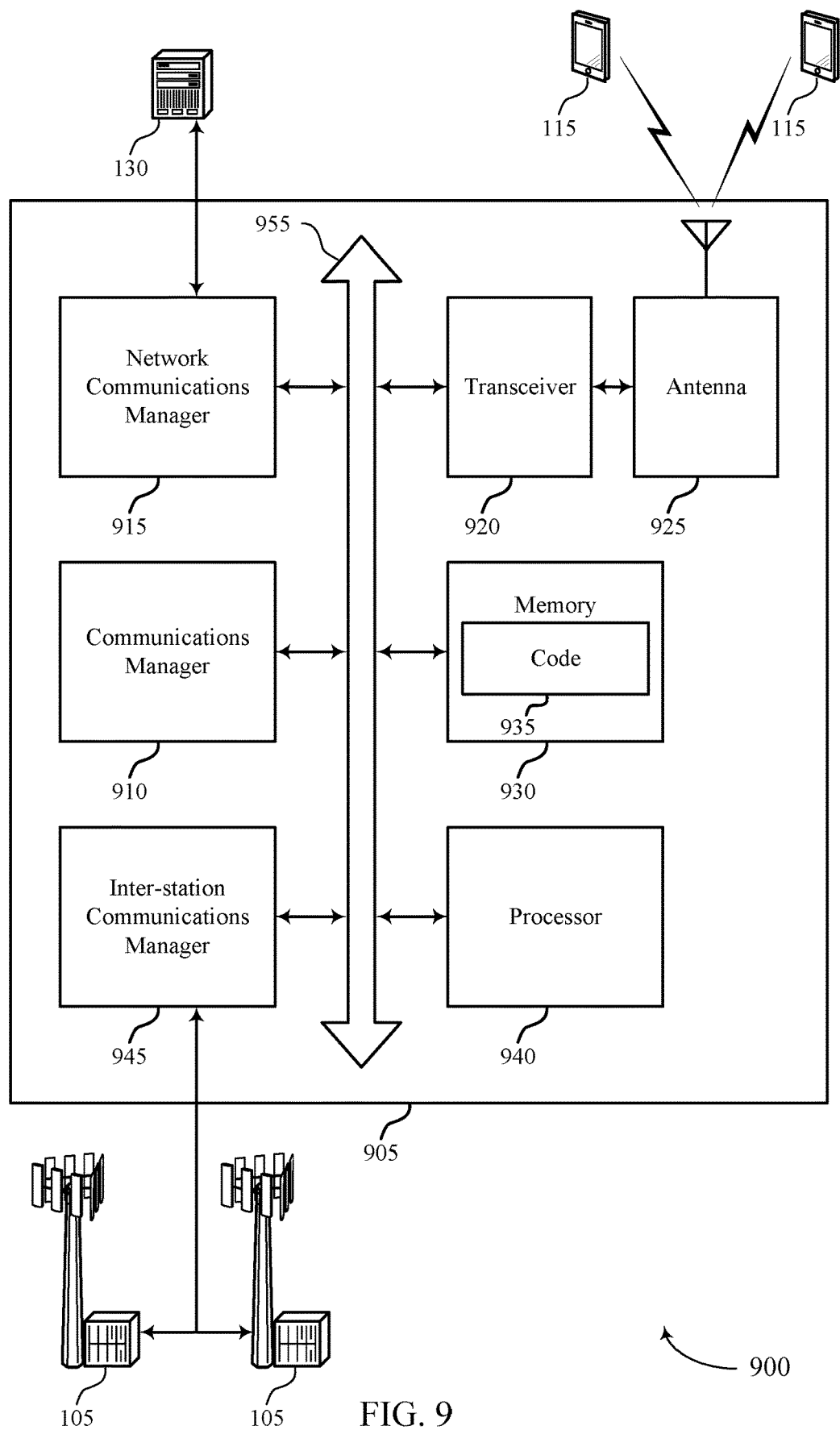
FIG. 9 shows a diagram of a system including a base station that supports protection of control signaling in a wireless backhaul network in accordance with aspects of the present disclosure.

FIG. 9 shows a diagram of a system 900 including a device 905 that supports protection of control signaling in a wireless backhaul network in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

When the device 905 is configured as a first parent node, the communications manager 910 may receive, from a donor node of the wireless backhaul network, a token for a child node of the wireless backhaul network, the token being unique to a first wireless link between the first parent node and the child node, determine that a triggering event has occurred for a second wireless link between the first parent node and a second parent node, and transmit, in response to determining that the triggering event has occurred, the token to the child node over the first wireless link to indicate for the child node to select a third parent node of the wireless backhaul network.

When the device 905 is configured as a child node, the communications manager 910 may also configure, for a connection with a donor node of the wireless backhaul network and via a first parent node, one or more parameters for a token for the child node that is unique to a first wireless link between the child node and the first parent node, receive the token from the first parent node over the first wireless link of the wireless backhaul network indicating that a triggering event has occurred for a second wireless link between the first parent node and a second parent node, and verify the integrity of the received token based on the configured one or more parameters for the token.

When the device 905 is configured as a donor node, the communications manager 910 may also configure, during a connection establishment procedure with a child node of the wireless backhaul network, a token for the child node that is unique to a first wireless link between a first parent node and the child node and transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting protection of control signaling in a wireless backhaul network).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
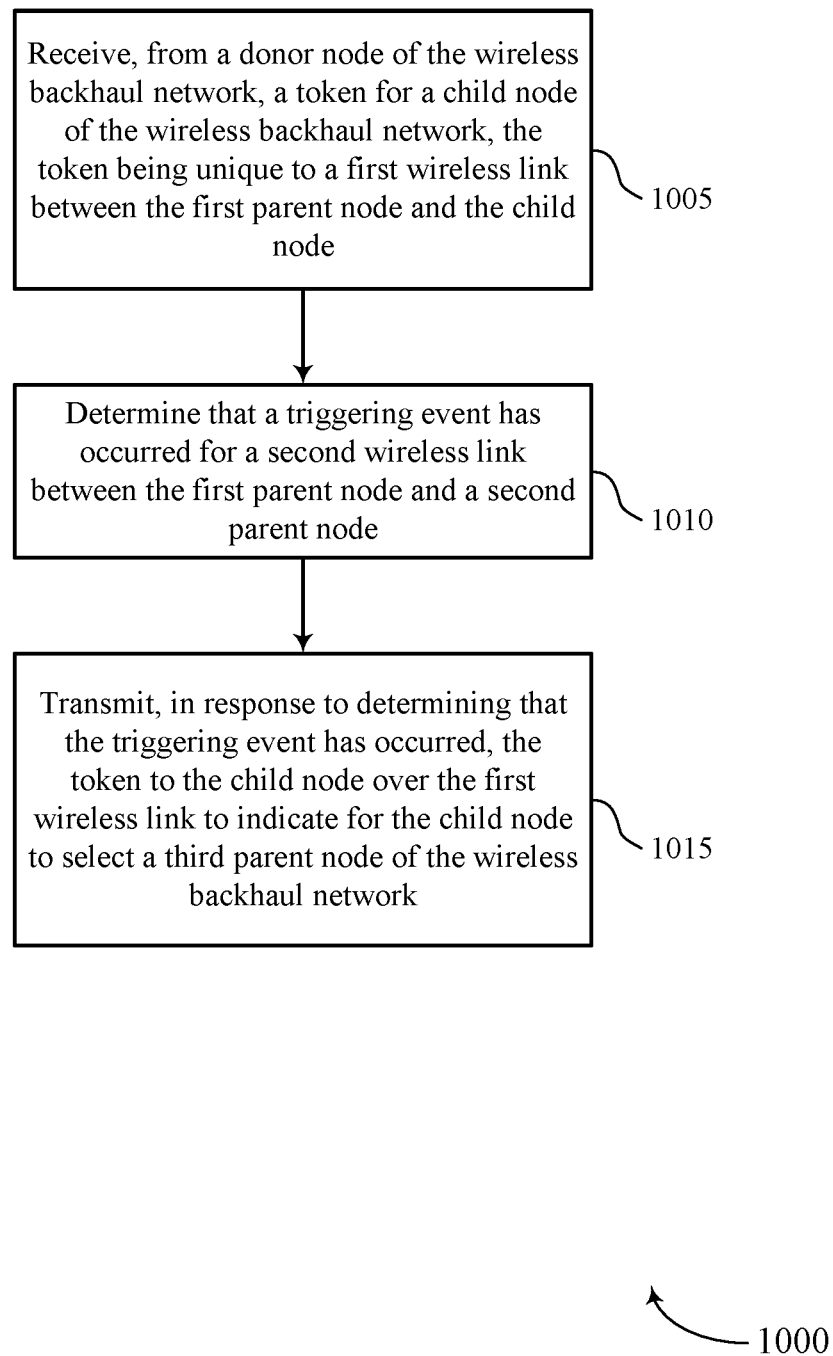
FIGS. 10 through 15 show flowcharts illustrating methods that support protection of control signaling in a wireless backhaul network in accordance with aspects of the present disclosure.

FIG. 10 shows a flowchart illustrating a method 1000 that supports protection of control signaling in a wireless backhaul network in accordance with aspects of the present disclosure. The operations of method 1000 may be implemented by a first parent node, which may be a UE 115 or base station 105, or its components as described herein, e.g., when configured as a first parent node. For example, the operations of method 1000 may be performed by a communications manager as described with reference to FIGS. 5 through 9. In some examples, a first parent node may execute a set of instructions to control the functional elements of the first parent node to perform the functions described below. Additionally or alternatively, a first parent node may perform aspects of the functions described below using special-purpose hardware.

At 1005, the first parent node may receive, from a donor node of the wireless backhaul network, a token for a child node of the wireless backhaul network, the token being unique to a first wireless link between the first parent node and the child node. The child node may be a downstream child node (e.g., a UE 115 or base station 105 configured as the downstream child node). The operations of 1005 may be performed according to the methods described herein. In some examples, aspects of the operations of 1005 may be performed by a parent node token manager as described with reference to FIGS. 5 through 9.

At 1010, the first parent node may determine that a triggering event has occurred for a second wireless link between the first parent node and a second parent node. The second parent node may be an upstream parent node (e.g., a UE 115 or base station 105 configured as the upstream parent node) or the donor node. The operations of 1010 may be performed according to the methods described herein. In some examples, aspects of the operations of 1010 may be performed by a parent node token manager as described with reference to FIGS. 5 through 9.

At 1015, the first parent node may transmit, in response to determining that the triggering event has occurred, the token to the child node over the first wireless link to indicate for the child node to select a third parent node of the wireless backhaul network. The third parent node may be an upstream parent node (e.g., a UE 115 or base station 105 configured as the upstream parent node) or the donor node. The operations of 1015 may be performed according to the methods described herein. In some examples, aspects of the operations of 1015 may be performed by a parent node token manager as described with reference to FIGS. 5 through 9.

Figure 11:
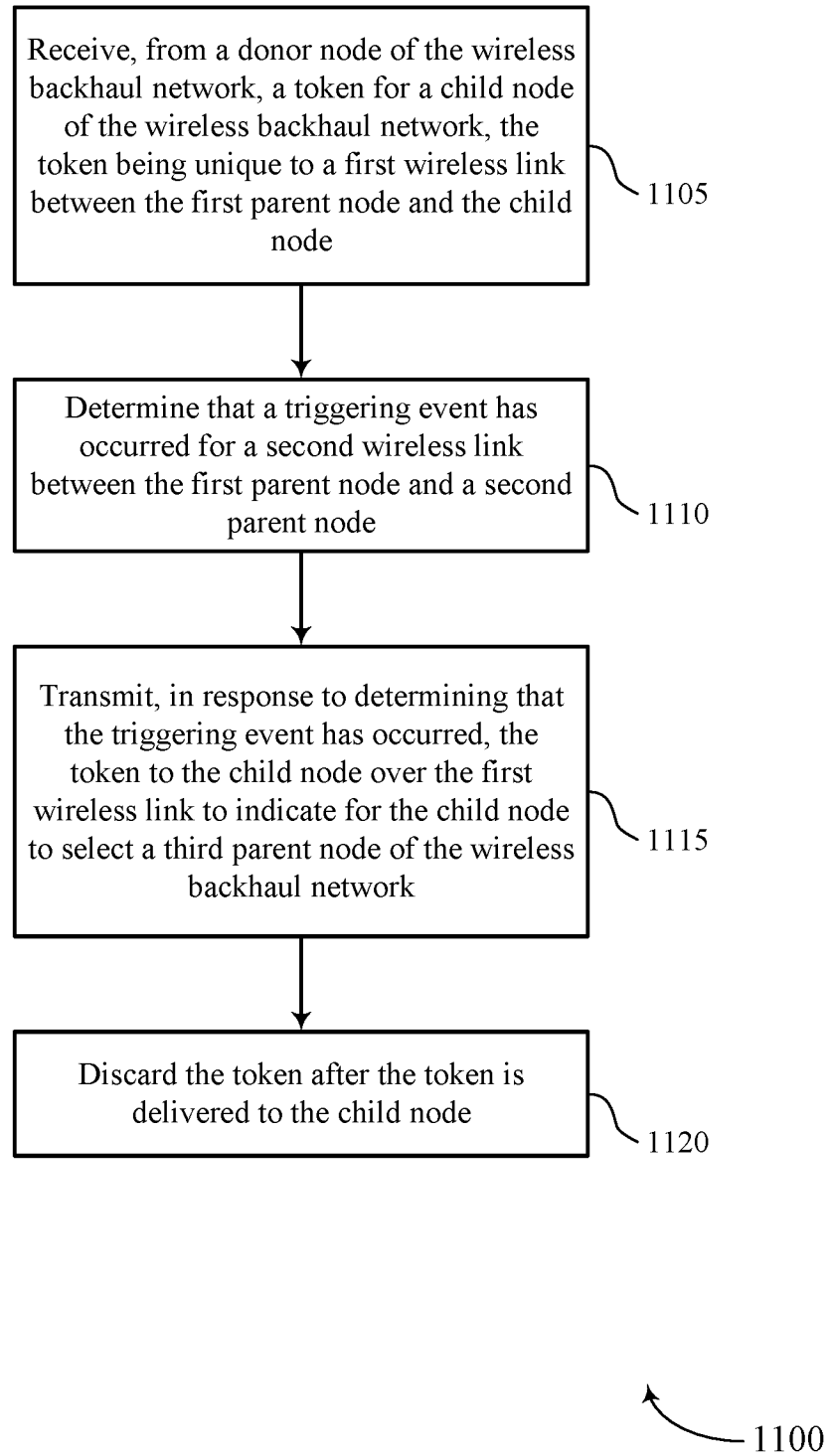

FIG. 11 shows a flowchart illustrating a method 1100 that supports protection of control signaling in a wireless backhaul network in accordance with aspects of the present disclosure. The operations of method 1100 may be implemented by a first parent node, which may be a UE 115 or base station 105, or its components as described herein, e.g., when configured as a first parent node. For example, the operations of method 1100 may be performed by a communications manager as described with reference to FIGS. 5 through 9. In some examples, a first parent node may execute a set of instructions to control the functional elements of the first parent node to perform the functions described below. Additionally or alternatively, a first parent node may perform aspects of the functions described below using special-purpose hardware.

At 1105, the first parent node may receive, from a donor node of the wireless backhaul network, a token for a child node of the wireless backhaul network, the token being unique to a first wireless link between the first parent node and the child node. The operations of 1105 may be performed according to the methods described herein. In some examples, aspects of the operations of 1105 may be performed by a parent node token manager as described with reference to FIGS. 5 through 9.

At 1110, the first parent node may determine that a triggering event has occurred for a second wireless link between the first parent node and a second parent node. The operations of 1110 may be performed according to the methods described herein. In some examples, aspects of the operations of 1110 may be performed by a parent node token manager as described with reference to FIGS. 5 through 9.

At 1115, the first parent node may transmit, in response to determining that the triggering event has occurred, the token to the child node over the first wireless link to indicate for the child node to select a third parent node of the wireless backhaul network. The operations of 1115 may be performed according to the methods described herein. In some examples, aspects of the operations of 1115 may be performed by a parent node token manager as described with reference to FIGS. 5 through 9.

At 1120, the first parent node may discard the token after the token is delivered to the child node. The operations of 1120 may be performed according to the methods described herein. In some examples, aspects of the operations of 1120 may be performed by a token discard manager as described with reference to FIGS. 5 through 9.

Figure 12:
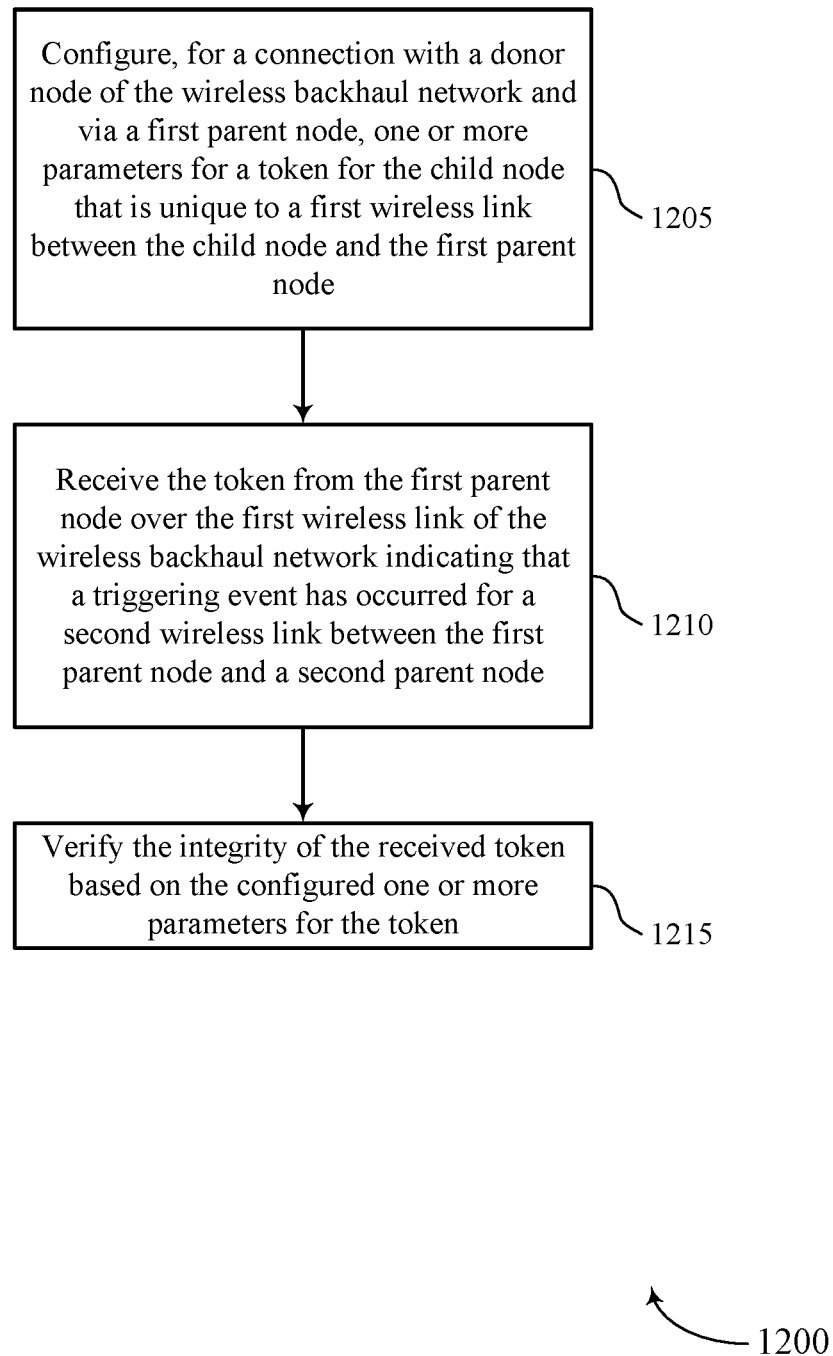

FIG. 12 shows a flowchart illustrating a method 1200 that supports protection of control signaling in a wireless backhaul network in accordance with aspects of the present disclosure. The operations of method 1200 may be implemented by a child node, which may be a UE 115 or base station 105 or its components as described herein, e.g., when configured as a child node. For example, the operations of method 1200 may be performed by a communications manager as described with reference to FIGS. 5 through 9. In some examples, a child node may execute a set of instructions to control the functional elements of the child node to perform the functions described below. Additionally or alternatively, a child node may perform aspects of the functions described below using special-purpose hardware.

At 1205, the child node may configure, for a connection with a donor node of the wireless backhaul network and via a first parent node, one or more parameters for a token for the child node that is unique to a first wireless link between the child node and the first parent node. The operations of 1205 may be performed according to the methods described herein. In some examples, aspects of the operations of 1205 may be performed by a child node token manager as described with reference to FIGS. 5 through 9.

At 1210, the child node may receive the token from the first parent node over the first wireless link of the wireless backhaul network indicating that a triggering event has occurred for a second wireless link between the first parent node and a second parent node. The operations of 1210 may be performed according to the methods described herein. In some examples, aspects of the operations of 1210 may be performed by a child node token manager as described with reference to FIGS. 5 through 9.

At 1215, the child node may verify the integrity of the received token based on the configured one or more parameters for the token. The operations of 1215 may be performed according to the methods described herein. In some examples, aspects of the operations of 1215 may be performed by a child node token manager as described with reference to FIGS. 5 through 9.

Figure 13:
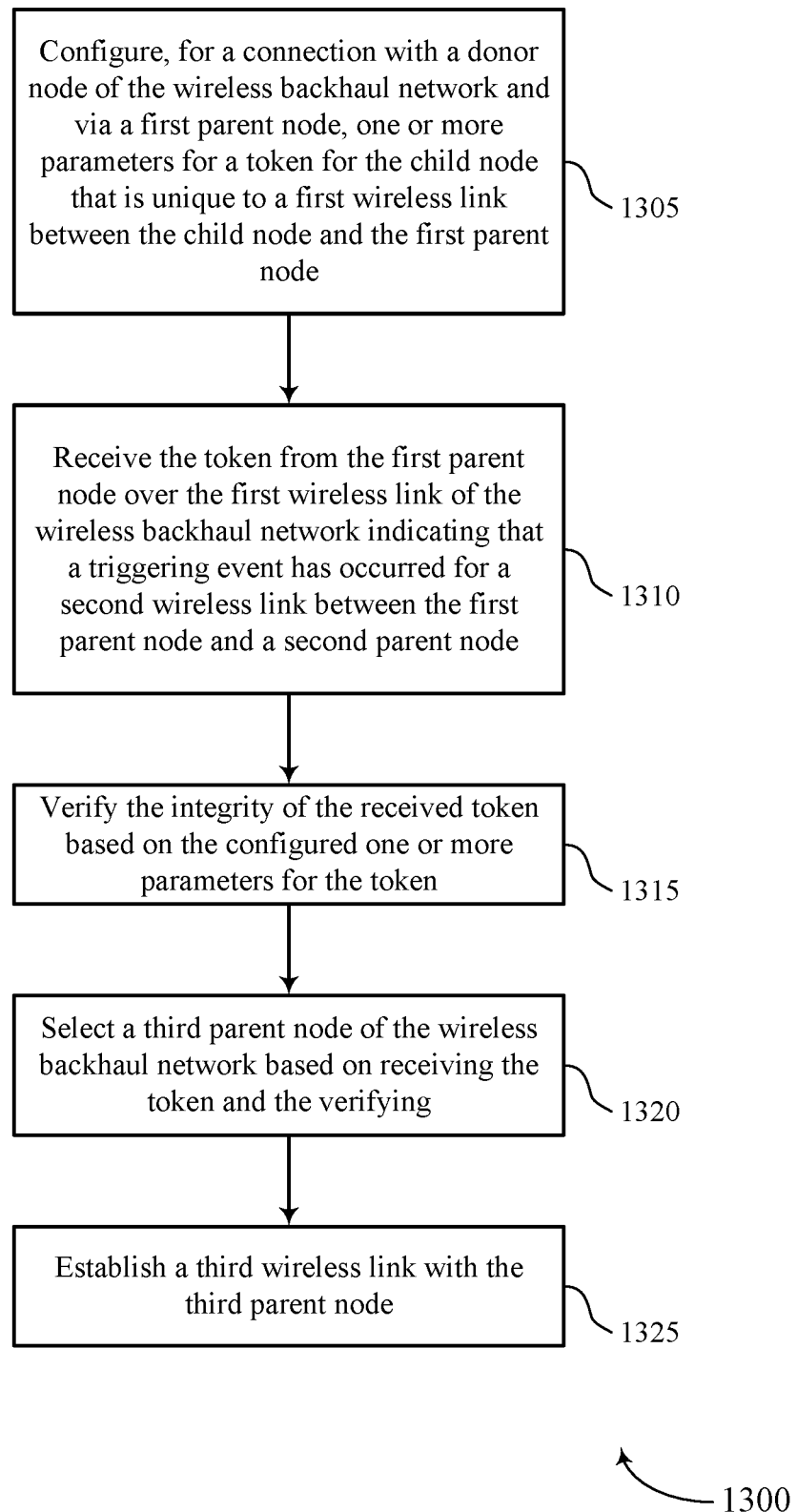

FIG. 13 shows a flowchart illustrating a method 1300 that supports protection of control signaling in a wireless backhaul network in accordance with aspects of the present disclosure. The operations of method 1300 may be implemented by a child node, which may be a UE 115 or base station 105 or its components as described herein, e.g., when configured as a child node. For example, the operations of method 1300 may be performed by a communications manager as described with reference to FIGS. 5 through 9. In some examples, a child node may execute a set of instructions to control the functional elements of the child node to perform the functions described below. Additionally or alternatively, a child node may perform aspects of the functions described below using special-purpose hardware.

At 1305, the child node may configure, for a connection with a donor node of the wireless backhaul network and via a first parent node, one or more parameters for a token for the child node that is unique to a first wireless link between the child node and the first parent node. The operations of 1305 may be performed according to the methods described herein. In some examples, aspects of the operations of 1305 may be performed by a child node token manager as described with reference to FIGS. 5 through 9.

At 1310, the child node may receive the token from the first parent node over the first wireless link of the wireless backhaul network indicating that a triggering event has occurred for a second wireless link between the first parent node and a second parent node. The operations of 1310 may be performed according to the methods described herein. In some examples, aspects of the operations of 1310 may be performed by a child node token manager as described with reference to FIGS. 5 through 9.

At 1315, the child node may verify the integrity of the received token based on the configured one or more parameters for the token. The operations of 1315 may be performed according to the methods described herein. In some examples, aspects of the operations of 1315 may be performed by a child node token manager as described with reference to FIGS. 5 through 9.

At 1320, the child node may select a third parent node of the wireless backhaul network based on receiving the token and the verifying. The operations of 1320 may be performed according to the methods described herein. In some examples, aspects of the operations of 1320 may be performed by a cell reselection manager as described with reference to FIGS. 5 through 9.

At 1325, the child node may establish a third wireless link with the third parent node. The operations of 1325 may be performed according to the methods described herein. In some examples, aspects of the operations of 1325 may be performed by a cell reselection manager as described with reference to FIGS. 5 through 9.

Figure 14:
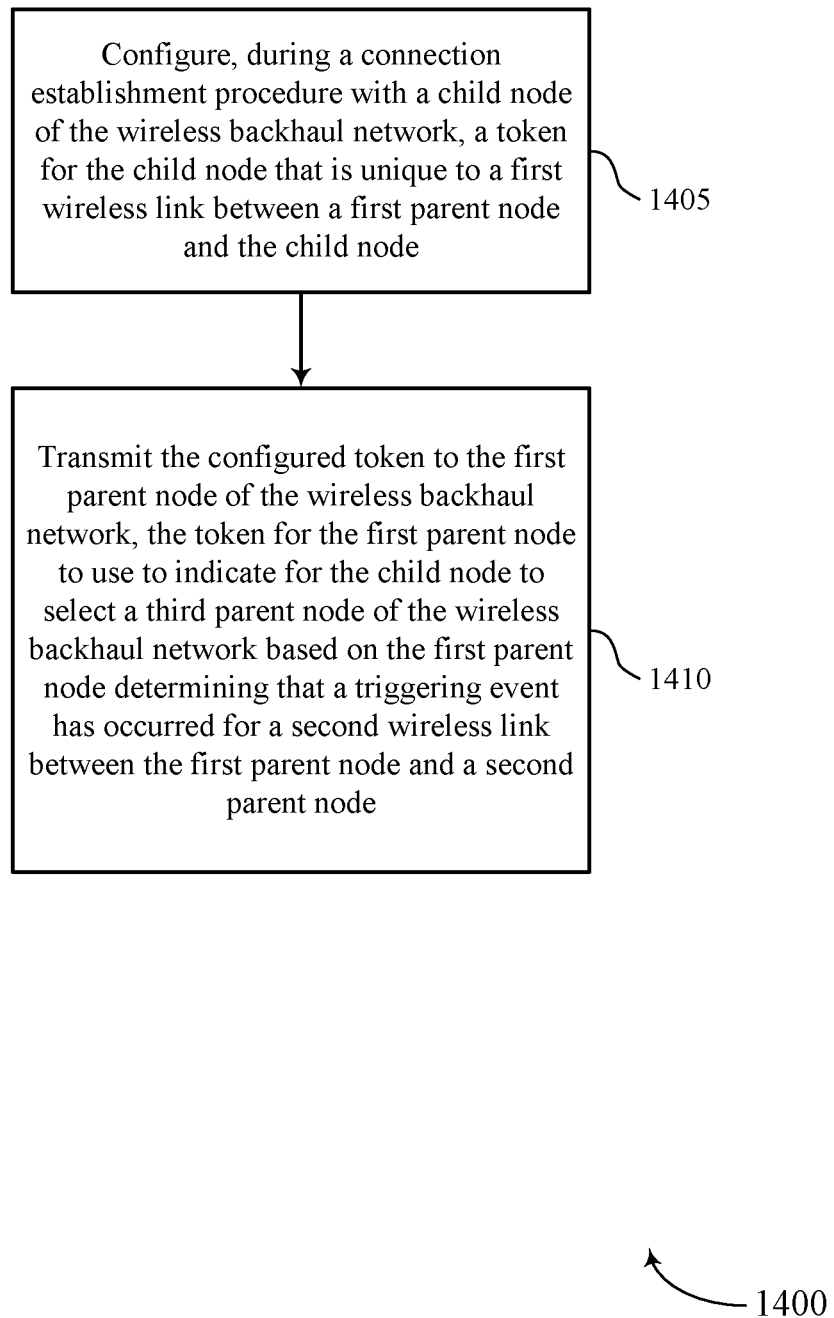

FIG. 14 shows a flowchart illustrating a method 1400 that supports protection of control signaling in a wireless backhaul network in accordance with aspects of the present disclosure. The operations of method 1400 may be implemented by a donor node, which may be a UE 115 or base station 105 or its components as described herein, e.g., when configured as a donor node. For example, the operations of method 1400 may be performed by a communications manager as described with reference to FIGS. 5 through 9. In some examples, a donor node may execute a set of instructions to control the functional elements of the donor node to perform the functions described below. Additionally or alternatively, a donor node may perform aspects of the functions described below using special-purpose hardware.

At 1405, the donor node may configure, during a connection establishment procedure with a child node of the wireless backhaul network, a token for the child node that is unique to a first wireless link between a first parent node and the child node. The operations of 1405 may be performed according to the methods described herein. In some examples, aspects of the operations of 1405 may be performed by a donor node token manager as described with reference to FIGS. 5 through 9.

At 1410, the donor node may transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node. The operations of 1410 may be performed according to the methods described herein. In some examples, aspects of the operations of 1410 may be performed by a donor node token manager as described with reference to FIGS. 5 through 9.

Figure 15:
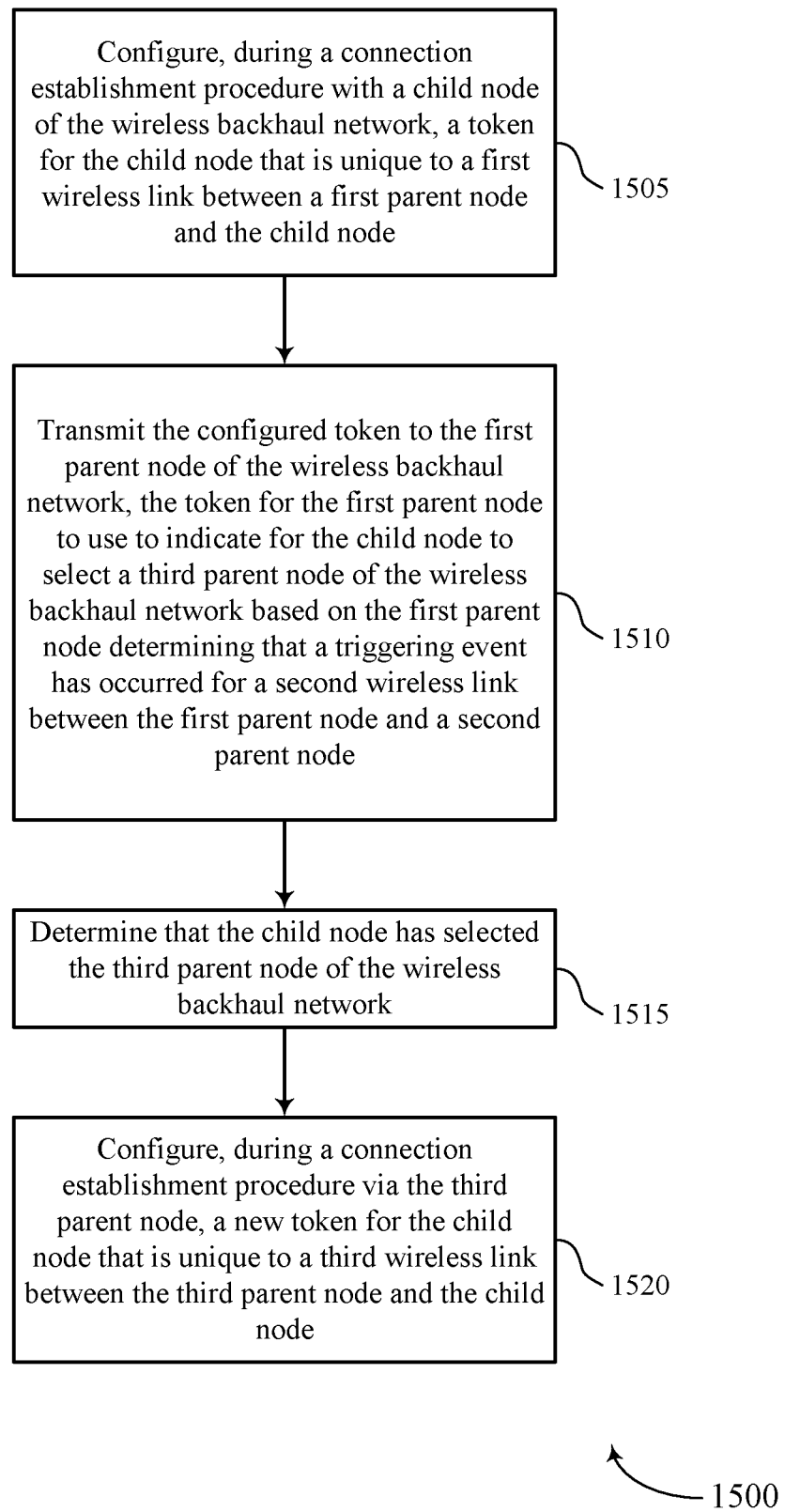

FIG. 15 shows a flowchart illustrating a method 1500 that supports protection of control signaling in a wireless backhaul network in accordance with aspects of the present disclosure. The operations of method 1500 may be implemented by a donor node, which may be a UE 115 or base station 105 or its components as described herein, e.g., when configured as a donor node. For example, the operations of method 1500 may be performed by a communications manager as described with reference to FIGS. 5 through 9. In some examples, a donor node may execute a set of instructions to control the functional elements of the donor node to perform the functions described below. Additionally or alternatively, a donor node may perform aspects of the functions described below using special-purpose hardware.

At 1505, the donor node may configure, during a connection establishment procedure with a child node of the wireless backhaul network, a token for the child node that is unique to a first wireless link between a first parent node and the child node. The operations of 1505 may be performed according to the methods described herein. In some examples, aspects of the operations of 1505 may be performed by a donor node token manager as described with reference to FIGS. 5 through 9.

At 1510, the donor node may transmit the configured token to the first parent node of the wireless backhaul network, the token for the first parent node to use to indicate for the child node to select a third parent node of the wireless backhaul network based on the first parent node determining that a triggering event has occurred for a second wireless link between the first parent node and a second parent node. The operations of 1510 may be performed according to the methods described herein. In some examples, aspects of the operations of 1510 may be performed by a donor node token manager as described with reference to FIGS. 5 through 9.

At 1515, the donor node may determine that the child node has selected the third parent node of the wireless backhaul network. The operations of 1515 may be performed according to the methods described herein. In some examples, aspects of the operations of 1515 may be performed by a cell reselection manager as described with reference to FIGS. 5 through 9.

At 1520, the donor node may configure, during a connection establishment procedure via the third parent node, a new token for the child node that is unique to a third wireless link between the third parent node and the child node. The operations of 1520 may be performed according to the methods described herein. In some examples, aspects of the operations of 1520 may be performed by a cell reselection manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first parent node of a wireless backhaul network, comprising:
   receiving, from a donor node of the wireless backhaul network, a token associated with a reselection procedure for a child node of the wireless backhaul network, the token being unique to a first wireless link between the first parent node and the child node and associated with a procedure to determine whether to perform the reselection procedure;

determining that a triggering event has occurred after receiving the token, the triggering event associated with a link between the first parent node and the donor node; and transmitting, in response to determining that the triggering event has occurred, the token to the child node over the first wireless link to trigger the procedure to determine whether to perform the reselection procedure at the child node to select a new parent node of the wireless backhaul network based at least in part on a verification of the token.

2. The method of claim 1, further comprising:
discarding the token in response to transmitting the token to the child node.

3. The method of claim 1, wherein the token is transmitted to the child node using a uni-cast transmission, or a broadcast transmission, or a control channel transmission, or a data channel transmission, or a combination thereof.

4. The method of claim 1, wherein determining that the triggering event has occurred comprises:
determining a radio link failure for the link between the first parent node and the donor node, the token transmitted to the child node in response to the radio link failure.

5. The method of claim 1, wherein determining that the triggering event has occurred comprises:
determining that the child node is to tune away from the first wireless link with the first parent node.

6. The method of claim 1, wherein determining that the triggering event has occurred comprises:
determining that a metric of the link between the first parent node and the donor node satisfies or fails to satisfy a threshold value.

7. The method of claim 1, wherein determining that the triggering event has occurred comprises:
receiving an indication that the child node is to perform a cell reselection procedure away from the first parent node.

8. The method of claim 1, wherein receiving the token comprises:
receiving the token from the donor node in a radio resource control (RRC) signaling.

9. The method of claim 1, wherein transmitting the token comprises:
transmitting the token to the child node in a media access control (MAC) control element, or a backhaul adaptation protocol signaling, or a radio link control (RLC) signaling, or a combination thereof.

10. The method of claim 1, wherein the link between the first parent node and the donor node includes a link with a node that is upstream relative to the first parent node and downstream relative to the donor node.

11. An apparatus for wireless communication at a first parent node of a wireless backhaul network, comprising:
a processor,
memory coupled with the processor; and
instructions stored in the memory and executable by the processor to cause the apparatus to:
receive, from a donor node of the wireless backhaul network, a token associated with a reselection procedure for a child node of the wireless backhaul network, the token being unique to a first wireless link between the first parent node and the child node and associated with a procedure to determine whether to perform the reselection procedure;

determine that a triggering event has occurred after receiving the token, the triggering event associated with a link between the first parent node and the donor node; and transmit, in response to determining that the triggering event has occurred, the token to the child node over the first wireless link to trigger the procedure to determine whether to perform the reselection procedure at the child node to select a new parent node of the wireless backhaul network based at least in part on a verification of the token.

12. The apparatus of claim 11, wherein the instructions are further executable by the processor to cause the apparatus to:
discard the token in response to transmitting the token to the child node.

13. The apparatus of claim 11, wherein the token is transmitted to the child node using a uni-cast transmission, or a broadcast transmission, or a control channel transmission, or a data channel transmission, or a combination thereof.

14. The apparatus of claim 11, wherein the instructions to determine that the triggering event has occurred are executable by the processor to cause the apparatus to:
determine a radio link failure for the link between the first parent node and the donor node, the token transmitted to the child node in response to the radio link failure.

15. The apparatus of claim 11, wherein the instructions to determine that the triggering event has occurred are executable by the processor to cause the apparatus to:
determine that the child node is to tune away from the first wireless link with the first parent node.

16. The apparatus of claim 11, wherein the instructions to determine that the triggering event has occurred are executable by the processor to cause the apparatus to:
determine that a metric of the link between the first parent node and the donor node satisfies or fails to satisfy a threshold value.

17. The apparatus of claim 11, wherein the instructions to determine that the triggering event has occurred are executable by the processor to cause the apparatus to:
receive an indication that the child node is to perform a cell reselection procedure away from the first parent node.

18. The apparatus of claim 11, wherein the instructions to receive the token are executable by the processor to cause the apparatus to:
receive the token from the donor node in a media access control (MAC) control element, or a backhaul adaptation protocol signaling, or a radio link control (RLC) signaling, or a combination thereof.

19. The apparatus of claim 11, wherein the instructions to transmit the token are executable by the processor to cause the apparatus to:
transmit the token to the child node in a media access control (MAC) control element, or a backhaul adaptation protocol signaling, or a radio link control (RLC) signaling, or a combination thereof.

20. The apparatus of claim 11, wherein the link between the first parent node and the donor node includes a link with a node that is upstream relative to the first parent node and downstream relative to the donor node.

21. An apparatus for wireless communication at a first parent node of a wireless backhaul network, comprising:
means for receiving, from a donor node of the wireless backhaul network, a token associated with a reselection procedure for a child node of the wireless backhaul network, the token being unique to a first wireless link between the first parent node and the child node and associated with a procedure to determine whether to perform the reselection procedure;

means for determining that a triggering event has occurred after receiving the token, the triggering event associated with a link between the first parent node and the donor node; and means for transmitting, in response to determining that the triggering event has occurred, the token to the child node over the first wireless link to trigger the procedure to determine whether to perform the reselection procedure at the child node to select a new parent node of the wireless backhaul network based at least in part on a verification of the token.

22. The apparatus of claim 21, further comprising:
means for discarding the token in response to transmitting the token to the child node.

23. The apparatus of claim 21, wherein the token is transmitted to the child node using a uni-cast transmission, or a broadcast transmission, or a control channel transmission, or a data channel transmission, or a combination thereof.

24. The apparatus of claim 21, wherein the means for determining that the triggering event has occurred comprises:
means for determining a radio link failure for the link between the first parent node and the donor node, the token transmitted to the child node in response to the radio link failure.

25. The apparatus of claim 21, wherein the means for determining that the triggering event has occurred comprises:
means for determining that the child node is to tune away from the first wireless link with the first parent node.

26. The apparatus of claim 21, wherein the means for determining that the triggering event has occurred comprises:
means for determining that a metric of the link between the first parent node and the donor node satisfies or fails to satisfy a threshold value.

27. A non-transitory computer-readable medium storing code for wireless communication at a first parent node of a wireless backhaul network, the code comprising instructions executable by a processor to:

receive, from a donor node of the wireless backhaul network, a token associated with a reselection procedure for a child node of the wireless backhaul network, the token being unique to a first wireless link between the first parent node and the child node and associated with a procedure to determine whether to perform the reselection procedure;

determine that a triggering event has occurred after receiving the token, the triggering event associated with a link between the first parent node and the donor node; and transmit, in response to determining that the triggering event has occurred, the token to the child node over the first wireless link to trigger the procedure to determine whether to perform the reselection procedure at the child node to select a new parent node of the wireless backhaul network based at least in part on a verification of the token.

28. The method of claim 1, wherein the token is received before the triggering event occurs.

29. The method of claim 1, further comprising:
communicating, via the first parent node and before the token is received from the donor node, a message comprising a security key between the child node and the donor node, wherein the token is based at least in part on the security key.

30. The method of claim 1, further comprising:
communicating, via the first parent node and before the token is received from the donor node, a message comprising one or more physical parameters associated with the first parent node between the child node and the donor node, wherein the token is based at least in part on the one or more physical parameters.

\* \* \* \* \*